(12) United States Patent
Smith et al.

(10) Patent No.: US 7,093,761 B2
(45) Date of Patent: *Aug. 22, 2006

(54) SYSTEM AND METHOD FOR DISTRIBUTING STORED-VALUE CARDS

(75) Inventors: Merrill Brooks Smith, Atlanta, GA (US); Phillip Craig Graves, Atlanta, GA (US); Jonathan O'Neal, Kennesaw, GA (US)

(73) Assignee: e2interactive, Inc., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/732,641

(22) Filed: Dec. 10, 2003

(65) Prior Publication Data

US 2004/0118914 A1 Jun. 24, 2004

(51) Int. Cl.
*G06K 7/10* (2006.01)

(52) U.S. Cl. .................. 235/462.07; 235/380

(58) Field of Classification Search ............ 235/375, 235/381, 380, 382, 493, 462.01; 705/1, 26, 705/10
See application file for complete search history.

(56) References Cited

U.S. PATENT DOCUMENTS

| | | | |
|---|---|---|---|
| 5,577,109 A | 11/1996 | Stimson et al. | |
| 5,777,565 A * | 7/1998 | Hayashi et al. | 340/928 |
| 5,918,909 A | 7/1999 | Fiala et al. | |
| 5,930,363 A | 7/1999 | Stanford et al. | |
| 6,000,608 A | 12/1999 | Dorf | |
| 6,038,549 A | 3/2000 | Davis et al. | |
| 6,056,289 A * | 5/2000 | Clapper, Jr. | 273/138.2 |
| 6,185,545 B1 | 2/2001 | Resnick et al. | |
| 6,188,752 B1 | 2/2001 | Lesley | |
| 6,189,787 B1 | 2/2001 | Dorf | |
| 6,208,851 B1 | 3/2001 | Hanson | |
| RE37,122 E | 4/2001 | Levine et al. | |
| 6,282,566 B1 | 8/2001 | Lee, Jr. et al. | |
| 6,285,749 B1 | 9/2001 | Manto | |
| 6,314,171 B1 | 11/2001 | Dowens | |
| 6,315,206 B1 | 11/2001 | Hansen et al. | |

(Continued)

FOREIGN PATENT DOCUMENTS

GB 2333878 8/1999

OTHER PUBLICATIONS

WIPO, International Search Report dated Mar. 3, 2004, International Patent Application No. PCT/US02/30281, 3 pages.

*Primary Examiner*—Thien M. Le
(74) *Attorney, Agent, or Firm*—Hunton & Williams LLP

(57) ABSTRACT

A system and method for supplying communication service value is disclosed. In one embodiment, the method includes distributing indicia of an identifier to a merchant for distribution to a customer having a customer account. The identifier has an associated service value that is redeemable with a plurality of carriers. The method further includes activating the identifier upon distribution of the indicia to the customer. A central processor may verify whether the merchant is authorized to distribute the indicia to the customer. During distribution to the customer, the merchant may transmit prior transaction information to the central processor, and the central processor may reconcile past billing records based on such prior transaction information. The method also includes receiving a request from the customer to add the associated service value to the customer account and adding the associated service value to the customer account is disclosed. The system and method may be used with any type of stored-value card account, including prepaid emergency road service cards.

60 Claims, 21 Drawing Sheets

U.S. PATENT DOCUMENTS

| | | |
|---|---|---|
| 6,333,976 B1 | 12/2001 | Lesley |
| 6,375,073 B1 | 4/2002 | Aebi et al. |
| 6,386,457 B1 * | 5/2002 | Sorie .......................... 235/487 |
| 6,424,706 B1 | 7/2002 | Katz et al. |
| 6,434,379 B1 | 8/2002 | Despres et al. |
| 6,445,780 B1 | 9/2002 | Rosset |
| 6,473,500 B1 | 10/2002 | Risafi et al. |
| 6,581,827 B1 | 6/2003 | Welton |
| 6,588,658 B1 | 7/2003 | Blank |
| 6,592,035 B1 | 7/2003 | Mandile |
| 6,745,022 B1 | 6/2004 | Knox |
| 6,786,655 B1 * | 9/2004 | Cook et al. ................... 355/40 |
| 2001/0023415 A1 | 9/2001 | Keil |
| 2001/0033752 A1 * | 10/2001 | Cook et al. .................. 396/564 |
| 2001/0042784 A1 | 11/2001 | Fite et al. |
| 2002/0077076 A1 | 6/2002 | Suryanarayana et al. |
| 2002/0101966 A1 | 8/2002 | Nelson |
| 2002/0115424 A1 | 8/2002 | Bagoren et al. |
| 2002/0119767 A1 | 8/2002 | Fieldhouse et al. |
| 2002/0133457 A1 | 9/2002 | Gerlach et al. |
| 2003/0014266 A1 * | 1/2003 | Brown et al. .................. 705/1 |
| 2003/0105672 A1 * | 6/2003 | Epstein et al. ................ 705/26 |
| 2003/0194988 A1 | 10/2003 | Knox |
| 2004/0218741 A1 | 11/2004 | Welton |
| 2005/0060248 A1 * | 3/2005 | O'Neal ........................ 705/30 |

* cited by examiner

SYSTEM AND METHOD FOR DISTRIBUTING STORED-VALUE CARDS

CROSS-REFERENCE TO RELATED APPLICATIONS

This application claims priority to U.S. application Ser. No. 10/253,243 filed Sep. 24, 2002, which claims priority to U.S. Provisional Application No. 60/324,333 filed Sep. 24, 2001 and U.S. Provisional Application No. 60/396,404 filed Jul. 15, 2002, all of which are incorporated herein by reference in their entirety. This application also claims priority to U.S. patent application Ser. No. 10/698,084 filed Nov. 3, 2003, which is incorporated herein by reference in its entirety. This application also claims priority to U.S. Provisional Application No. 60/519,630 filed on Nov. 14, 2003 and U.S. Provisional Application No. 60/519,629 filed on Nov. 14, 2003, both of which are incorporated by reference in their entirety.

This application also claims priority to U.S. application Ser. No. 10/411,971, filed Apr. 11, 2003, which claims priority to U.S. application Ser. No. 09/641,363 filed Aug. 18, 2000, now issued U.S. Pat. No. 6,575,361, which claims priority to U.S. Provisional Application No. 60/149,740 filed Aug. 19, 1999, all of which are incorporated herein by reference. This application is also related to International Application No. PCT/US02/30281 filed Sep. 24, 2002 and U.S. application Ser. No. 10/655,828 filed Sep. 5, 2003, both of which are incorporated herein by reference. This application is also related to the U.S. application Ser. No. 10/712,182 filed Nov. 13, 2003, which is incorporated herein by reference in its entirety.

FIELD OF THE INVENTION

This invention relates to distributing and activating stored value cards, such as stored-value cards used to pre-purchase telecommunications service. In particular, this invention relates to specific embodiments of stored-value cards.

BACKGROUND OF THE INVENTION

This invention relates stored-value cards associated with stored-value accounts. More particularly, the invention relates to adding stored value to a stored-value account managed by a third party. The invention also relates to amending a user's stored-value account managed by a third party. The invention also relates to verifying a source of a request for a stored-value card transaction. Finally, the invention relates to the above functions of stored-value cards as applied to specific embodiments of stored value cards, such as prepaid emergency road service cards.

Customers purchase stored-value cards and accounts. They also purchase value to add to existing stored-value accounts. For instance, a customer may purchase a PIN associated with a particular value of time or money and a particular telecommunications provider. The purchases may occur at merchant terminals. The merchants may comprise any store that sells stored-value cards, PINs, or stored-value accounts.

This process is described at length in the applications listed above, and those applications are incorporated herein by reference in their entirety.

The stored-value accounts are associated with product and/or service providers. In a preferred embodiment of the present invention, the stored-value accounts are associated with wireless telecommunications service providers (sometimes referred to as carriers). For instance, the customer may purchase a $20 PIN to enable $20 of wireless service in a wireless stored-value account.

As described in the above-referenced applications, a customer may purchase a PIN that can be associated with a stored-value card/account. The PIN may be associated with a value. The PIN may be associated with a stored-value account at purchase. In a preferred embodiment, the PIN is later associated with a product or service provider selected by the purchaser/customer/user.

The customer may then contact a central processor to process the PIN. The customer may also directly contact a carrier (or other product or service-provider) to add value to an account. For instance, the customer may access a website associated with the carrier or call a phone number (such as an 800 number) such as the phone number of the carrier. Methods of activating a PIN or otherwise processing a PIN are well known in the art.

Processing a PIN may comprise redeeming the value, adding the value to a stored-value account, or otherwise processing the PIN or changing the customer's stored-value account. The account may be maintained by the provider, by a system associated with the central processor, by a merchant, or by a third-party.

During the request, the central processor may prompt the user for various information. For instance, the processor may request the user's PIN and/or MIN. The processor may also request personal information, such as the user's name, address, social security number, cellular (or other) phone number, other account numbers, identification numbers, etc.

During the process request, the central processor may prompt the user to select a provider. For instance, the central processor may request that that the user select a telecommunications carrier. The user may then select a particular provider/carrier. The user may select a carrier/provider for which the user has a preexisting stored-value account, and the preexisting stored-value account may be an account for which value can be added via PIN processing.

Users may also select a redemption method.

The user may select a provider that is affiliated with the central processor. For instance, the central processor may manage a particular affiliated carrier's stored-value accounts. Other business and system arrangements can be considered.

When a customer selects an affiliated provider, the central processor may process the request and amend the user's stored-value account directly. For instance, the central processor may maintain a database of PINs and stored-value accounts for users, and such database may include the PINs and stored-value accounts for the affiliated providers. Processing the request may comprise amending the stored records in the database associated with the user's stored-value account.

The central processor may not maintain the database of stored-value accounts for other providers. In order to process a PIN request for such providers, a central processor may transfer the request to the provider. For instance, if a customer makes the PIN request via phone, then the central processor's IVR may transfer the call to the carrier's phone system, which may comprise another IVR for processing PIN requests. If the request is via the internet, the central processor website may redirect the user to the carrier website (or provide a link or embed the carrier site or otherwise direct the user to the carrier system). The unaffiliated carrier may then process the PIN request, for instance in a manner known in the art.

Stored-value cards can be authorized and distributed over communications networks. Examples of communications networks include dedicated telephone lines, public telephone links, and the internet or other networked communication. The data of the stored-value cards is related to services and/or products prepaid by the owner or end user of the card. Examples of prepaid services that may be accommodated by the stored-value data include long distance telephone communication, wireless communication, paging and internet-enabled communication services, including wireless web access. Other examples of prepaid services and/or products that may be accommodated by the stored-value card include gift cards, prepaid gas cards, prepaid grocery cards, prepaid entertainment cards, downloadable ring tone cards, downloadable game cards, downloadable music cards that use MP3, MP4, WMV, WAV, or other music formats, any other downloadable software card, customer rewards cards, and any other type of stored-value cards for products, services, or both, that may be prepaid by the owner of the card.

Stored-value cards, such as prepaid long distance phone cards, are generally used in the telephone industry to allow customers to pre-purchase long distance calling time. Each of the cards has a printed identification number. Associated identification information can be magnetically stored therein or printed in a barcode. The identification number is also stored in a file in a database maintained by the card issuer. In the traditional business model, when the cards are sent to the retail location from which they will be sold, the corresponding records in the database are activated, thus allowing the card to be used immediately by a customer. To use the card as a prepaid long distance card, the customer dials a toll free number to access the card issuer's system, enters the identification number, and then makes the desired long-distance call.

These prior art prepaid phone card systems have several disadvantages. For example, since the cards are active while on the shelf in the retail location, the cards may be stolen by a thief and easily used. One way to address some of the drawbacks of prior art prepaid phone card systems would be to install activation terminals unique to the prepaid card issuer. This is referred to as a "closed system." U.S. Pat. No. 5,577,109 to Stimson et al. discloses such a closed system. In the Stimson system, the cards are not preactivated. Each of the retail locations from which cards are to be sold is provided with a dedicated activation terminal which allows the retail operator to set the value of the card at the time of the sale. The activation terminal connects to the card issuer's system to pass along the value amount and to request activation of the card. Depleted cards can be recharged in the same manner as they are sold. A serious disadvantage of the Stimson system is that it requires single-function dedicated hardware to be installed in each retail location, resulting in a very inflexible and expensive system.

U.S. Pat. No. 6,000,608 to Dorf provides a multifunction card system including a prepaid phone card activating system which allows cards to be purchased in varying amounts and to be recharged without requiring the use of a closed system to handle the transactions. Although Dorf purports to alleviate some of the drawbacks of Stimson by using point-of-sale devices connected to a banking system, it is believed that Dorf fails to verify sources of card activation requests so as to enhance detection of potential security breaches that could ensue in any system accessible to a large number of users.

It would be further desirable to provide a system and method for selectively processing stored-value card requests, such as stored-value card activation, deactivation, and/or value change, based on the communications network over which the request is transmitted. Additionally, it would be further desirable to provide a system and method for selectively processing stored-value card requests based on the source of the request, wherein such request can be received over a variety of communications networks that are available to unauthorized users. It would be further desirable to provide a method of determining a plurality of communications networks and a plurality of sources of activation requests that are authorized to carry or make valid requests, respectively, either prior to or at the same time as such requests are made.

SUMMARY OF THE INVENTION

This invention relates to stored-value cards that can be used for pre-purchasing emergency road service, legal service, accounting service, tax service, property cleaning and/or maintenance service, clothe cleaning service, transportation service, travel service, delivery service, online (or off-line) dating service, electrical and/or gas service, water service, sewage service, toilet or bathroom service, and film processing (including digital film processing).

The invention relates to stored-value cards. As described in the related applications, the data of the stored-value cards is related to services and/or products paid or prepaid by the owner or end user of the card. Each of the stored-value cards may be associated with a PIN.

Examples of prepaid services that may be accommodated by a stored-value card include long distance telephone communication, wireless communication, paging and internet-enabled communication services, including wireless web access, emergency road service, legal service, accounting service, tax service, property cleaning and/or maintenance service, clothe cleaning service, transportation service, travel service, delivery service, online (or off-line) dating service, electrical and/or gas service, water service, sewage service, internet access, and film processing (including digital film processing). Other examples of prepaid services and/or products that may be accommodated by a stored-value card include gift cards, prepaid gas cards, prepaid grocery cards, prepaid entertainment cards, prepaid movie cards, downloadable ring tone cards, downloadable game cards, downloadable movie cards, downloadable music cards that use MP3, MP4, WMV, WAV, or other music formats, any other downloadable software card, customer rewards cards, bridge and/or road toll cards, and any other type of stored-value cards for products, services, or both, that may be prepaid by the owner of the card.

Accordingly, a system and method for supplying communication service value is disclosed. In one embodiment, the method includes distributing indicia of an identifier to a merchant for distribution to a customer having a customer account. The identifier has an associated service value that is redeemable with a plurality of carriers. The method further includes activating the identifier upon distribution of the indicia to the customer. A central processor may verify whether the merchant is authorized to distribute the indicia to the customer. During distribution to the customer, the merchant may transmit prior transaction information to the central processor, and the central processor may reconcile past billing records based on such prior transaction information. The method also includes receiving a request from the customer to add the associated service value to the customer account and adding the associated service value to the customer account is disclosed.

Other embodiments could be considered.

DESCRIPTION OF THE DRAWINGS

The present invention can be more fully understood by reading the following detailed description together with the accompanying drawings, in which like reference indicators are used to designate like elements, and in which.

Figure 1:
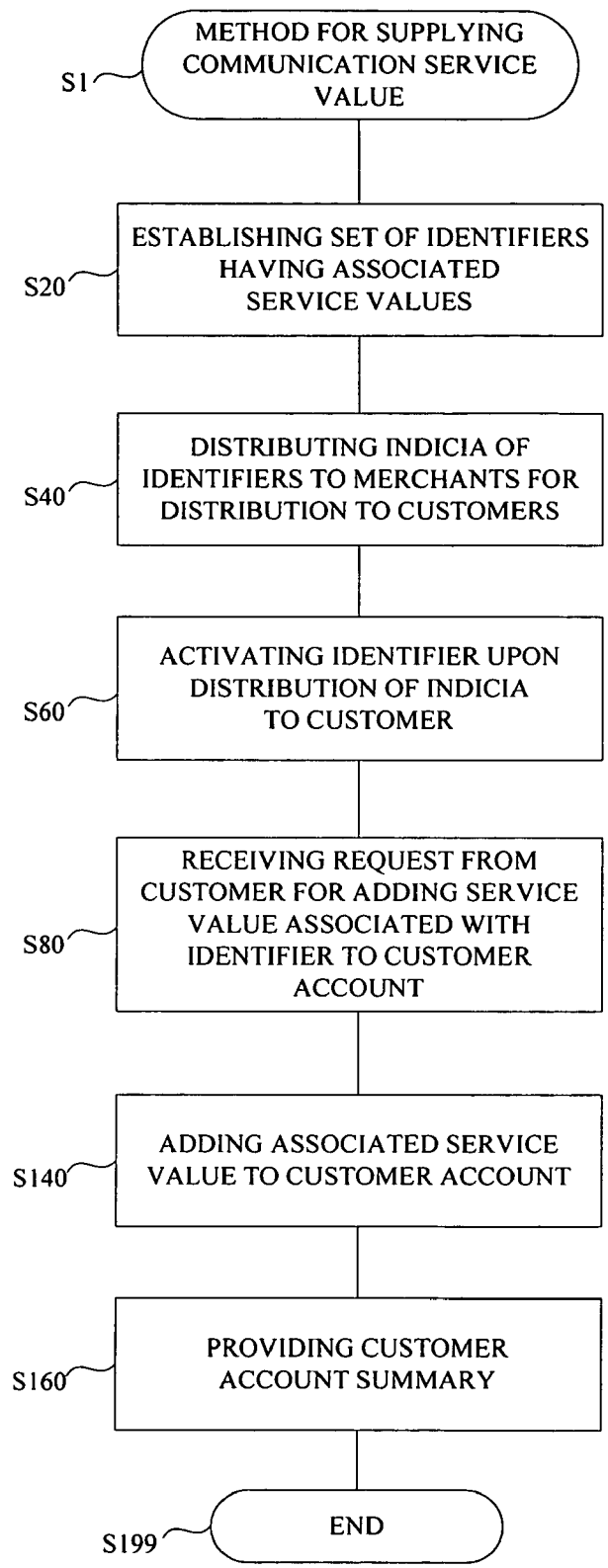
FIG. 1 is a flowchart showing a method for supplying communication service value in accordance with one embodiment of the invention.

Before any embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE INVENTION

Many wireless telephone users and other recipients of goods and/or services utilize prepaid account arrangements that require payment before services will be provided. It should be understood that prepaid wireless telephone service providers are used herein for exemplary purposes only. The invention relates to any provider of goods and/or services.

The prepaid customers pay as they go with the carrier deducting payment for the services provided directly from the customer's account. The invention, through a combination of technologies, provides a customer-friendly process that allows the customer to add service value, i.e., money or usage credits, to his customer account maintained by a carrier selected from a group of participating carriers, such that the customer can get the service needed.

In one aspect of the invention, a central system manages the process that allows the customer to add service value to the customer's account. The central system maintains a set of identifiers, or Personal Identification Numbers ("PINs"), with each identifier having an associated service value, which preferably represents a monetary figure (i.e., number of dollars, $10, $25 or $50, for example), or some unit of service usage (i.e., minutes). Indicia associated with the identifiers are distributed to merchants for further distribution to customers. In one example, the indicia may be distributed on magnetic stripe cards having predetermined values, such as $10, $25 and $50 cards. It should be appreciated that each indicia, or article bearing indicia, is associated with only one identifier maintained at the central system. Thus, each card distributed is linked to only one identifier maintained at the central system.

Once the customer selects the indicia, or an article bearing the indicia, the customer provides payment for the service value associated with the identifier represented by the indicia. For example, the customer pays $25 for a $25 card associated with an identifier associated with a $25 service value. The merchant sends a communication to the central system confirming the transaction with the customer so that the identifier at the central system can be activated. Following instructions provided with the indicia, the customer contacts the central system to have the service value added to the customer's account. The customer provides the central system with an input representing the identifier that has been activated, as well as the customer's account information. The customer's account information can also be utilized to identify the customer's carrier.

When the identifier and customer account information are verified, the central system communicates with the customer's carrier system to add the service value to the customer's account. Following the service value insertion, the customer's updated account information is obtained and provided to the customer. It should be appreciated that in at least one embodiment of the invention, some carriers do not provide direct service value insertion by the central system directly into the customer's account. For these carriers, an alternate carrier identifier is provided by the system, and the customer is transferred to the carrier system to complete the service value insertion.

As seen from the above examples, the central system acts as an intermediary between the customers, merchants and carriers. The central system maintains arrangements with several carriers to allow for value insertion, and becomes a broker of prepaid communication services. The customer is benefited by having access to a resource that can be obtained at several points of sale and allows an easy method to replenish service value for a number of participating carriers. The carriers benefit by having a product in the marketplace whereby customers can more easily replenish customer account balances. Lastly, the merchants benefit from increased sales because they are selling a product that is in demand because it is a single product that allows customers to select from a number of carriers.

In at least one implementation of the invention, the central system manages at least one relational database of information while also allowing access by the various users of the central system (i.e., customers, merchants, and administrators), to the various features and interfaces of the invention. A relational database system allows information contained in different tables to be accessed and shared, while also providing the additional advantage that changes to data contained in one table of a relational database affects the same data in any other table sharing the same data. A table is a collection of several data records with similar data information fields. Data records represent a collection of data that is organized into fields. These fields may also be formatted to receive data of varying types. Accordingly, the central system, or a user of the system, can process, query or report data contained in the various data tables and records for use in accomplishing the features of the invention. In one aspect of the invention, the various databases could include the set of identifiers and Mobile Identification Numbers ("MINs"), for example.

Method for Supplying Communication Service Value

In accordance with one embodiment of the invention, an illustrative flowchart showing a method for supplying communication service is shown in FIG. 1 and described below.

The process begins in step S1, and passes to step S20, which includes establishing a set of identifiers having associated service values. As described above, each identifier forms a part of a data record, or identifier record, that allows the central system to identify the specific associated service value that will later be sold to a customer. One example of an identifier is a Personal Identification Number ("PIN"). The PIN comprises one field of the identifier record, while another field in the same identifier record contains the associated service value. Illustratively, record X may have identifier ABC and an associated service value of $25. The service value is preferably a monetary figure (i.e., an amount in dollars, $10, $25 or $50, for example), but may also represent some unit of service usage, if supported by the carrier systems (i.e., minutes).

The set of identifiers forms the identifier database. Each identifier record may also contain fields for Status Indicator (i.e., whether the identifier is Active or Inactive), Serial Number, Visa Account Network Number (VAN), or a Merchant Code identifying the merchant through which the indicia will be distributed.

Following the establishment of the set of identifiers, in step S40, the process includes distributing indicia of the identifiers to merchants for distribution to customers. As described above, the indicia provides information related to the identifier for several reasons. First, the indicia allows the merchant to communicate to the central system the identifier that must be activated following distribution. Similarly, the information conveyed by the indicia later allows the customer to communicate to the central system the identifier and the service value purchased when the indicia was obtained from the merchant. It should be appreciated that the indicia may also encompass any article bearing such information. In other aspects, the indicia may provide instructions to the customer for communicating with the central system.

The indicia may comprise an article, such as magnetic stripe card, smart card, bar coded card, or any combination thereof. Either the magnetic stripe, chip or bar code would contain information that represents the card's identifier. Therefore, when completing the sale of the card to the customer, the merchant could swipe the card through a network terminal, or alternatively, scan the bar code on the card. The merchant's system would then locate the identifier and notify the central system of the sale of the article bearing the associated identifier.

To allow the customer to utilize the card upon purchase, the card also displays the identifier so that the customer can communicate the identifier to the central system. In addition, the card should display the service value associated with the identifier represented on the card to facilitate the customer's purchase of the correct card. Lastly, the card should contain instructions for communicating with the central system, i.e., a general toll-free number.

The indicia may also be provided to the customer through the delivery of a receipt or other notice. In such an embodiment, the customer would commence a purchase transaction at the point of sale, either through the merchant or a system device, such as a verifone terminal. The customer would request a certain prepaid service value, and upon payment, the central system would deliver the identifier to the point of sale for distribution to the customer.

Then, in step S60, the process includes activating an identifier upon distribution of indicia to a customer. As described above, the identifiers may be activated following communication from the merchants of the indicia distribution to the customers. This measure assists in avoiding the theft of the indicia prior to payment. The activation may include changing a status indicator associated with the specific identifier record from Inactive to Active. The communication between the merchant and central system preferably comprises a "host-to-host or Visanet connection", but may include any network communication wherein the central system receives input from the merchant system confirming the transaction. Accordingly, the features of the present invention may use or be combined with any of the features described in U.S. application Ser. No. 09/641,363, filed Aug. 18, 2000, which is incorporated herein by reference in its entirety.

Following the distribution of the indicia to the customer, in step S80, the process includes receiving a request from the customer for adding the service value associated with the identifier to a customer account. To handle the request, in one embodiment of the invention, the central system includes an Interactive Voice Response ("IVR") system that the customer can contact through a dedicated telephone number. Upon calling the number, the customer is presented with a series of voice prompts, process selections and other options that assist the customer in requesting that the service value purchased be added to the customer account.

It should be appreciated that the IVR system may be configured to provide voice prompts to the customer requesting customer input, accepting the customer's input (i.e., by capturing the DTMF, for example), and processing the customer's input to provide adequate responses and take the necessary actions. The customer's request includes the customer's entire communication session with the central system, i.e., the customer's interaction with the IVR system. Hereinafter, it should be appreciated that any request for input from the customer by the IVR system may be in the form of a voice prompt or message requesting the customer to select a numbered option on a telephone keypad. Although contemplated for automated use, at anytime during communication with the IVR system, the customer may choose an option that provides for transfer to customer service personnel who will complete the transaction for the customer.

Additionally, the IVR system may be configured to accept customer input meeting certain criteria, such as the correct number of digits in a number. When the customer input does not fit within the predetermined criteria (i.e., a 10-digit telephone number when the IVR system requests the customer's MIN), the IVR system may be configured to allow the customer to repeat an input, or when a certain predetermined number of incorrect inputs are received, transfer the customer to customer service personnel. The IVR system may also be configured to provide language selection features (i.e., the customer selects the language for the voice prompts, such as English, Spanish, French, German, for example), customer selection confirmation features, help features, customer instructions or other navigation features that may be accessed at anytime during communication with the central system.

While the above examples describe accessing the central system through the use of an IVR system, access to the central system may be achieved via any suitable communication interface, Ethernet connection, modem, telephone, digital or analog connections with the system using wireless communication devices (i.e., mobile phones, PDAs, or other handheld wireless communication devices), point of sale device or transceiver device (i.e., a verifone terminal, for example), token ring, Internet or Intranet or other computer connection, or any other suitable connection that allows the customer to receive input from and send output to the central system through the network connection.

Figure 2:
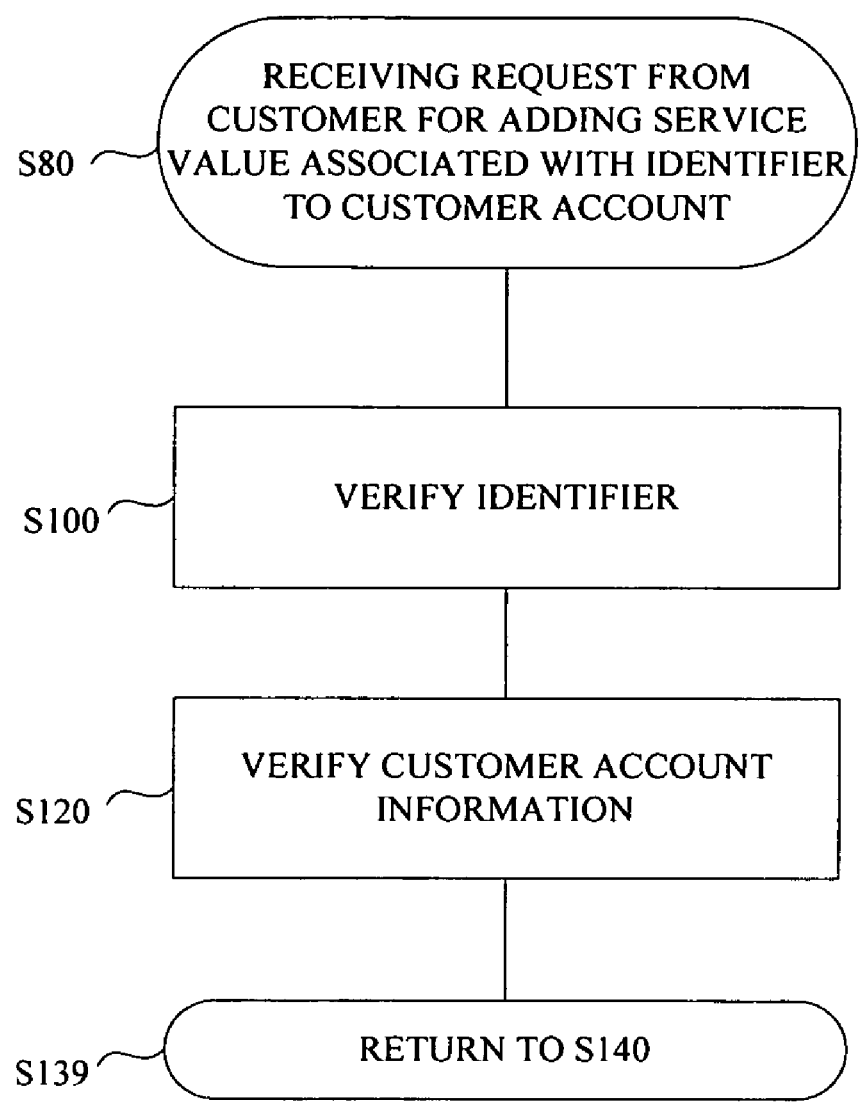
FIG. 2 is a flowchart showing the "receiving request from customer for adding service value associated with identifier to customer account" step of FIG. 1 in further detail in accordance with one embodiment of the invention.

FIG. 2 is a flowchart showing the "receiving request from customer for adding service value associated with identifier to customer account" step of FIG. 1 in further detail in accordance with one embodiment of the invention. The request from the customer to add the service value to the customer's account must include an identifier input (i.e., the PIN) representing the identifier associated with the indicia purchased, as well as input from the customer describing the customer's account (i.e., the customer's Mobile Identification Number, which allows the central system to identify the customer's carrier). Thus, as shown in FIG. 2, the process continues in step S80 and passes to step S100, wherein the identifier is verified. Following verification of the identifier, in step S120, the customer account information is verified.

Figure 3:
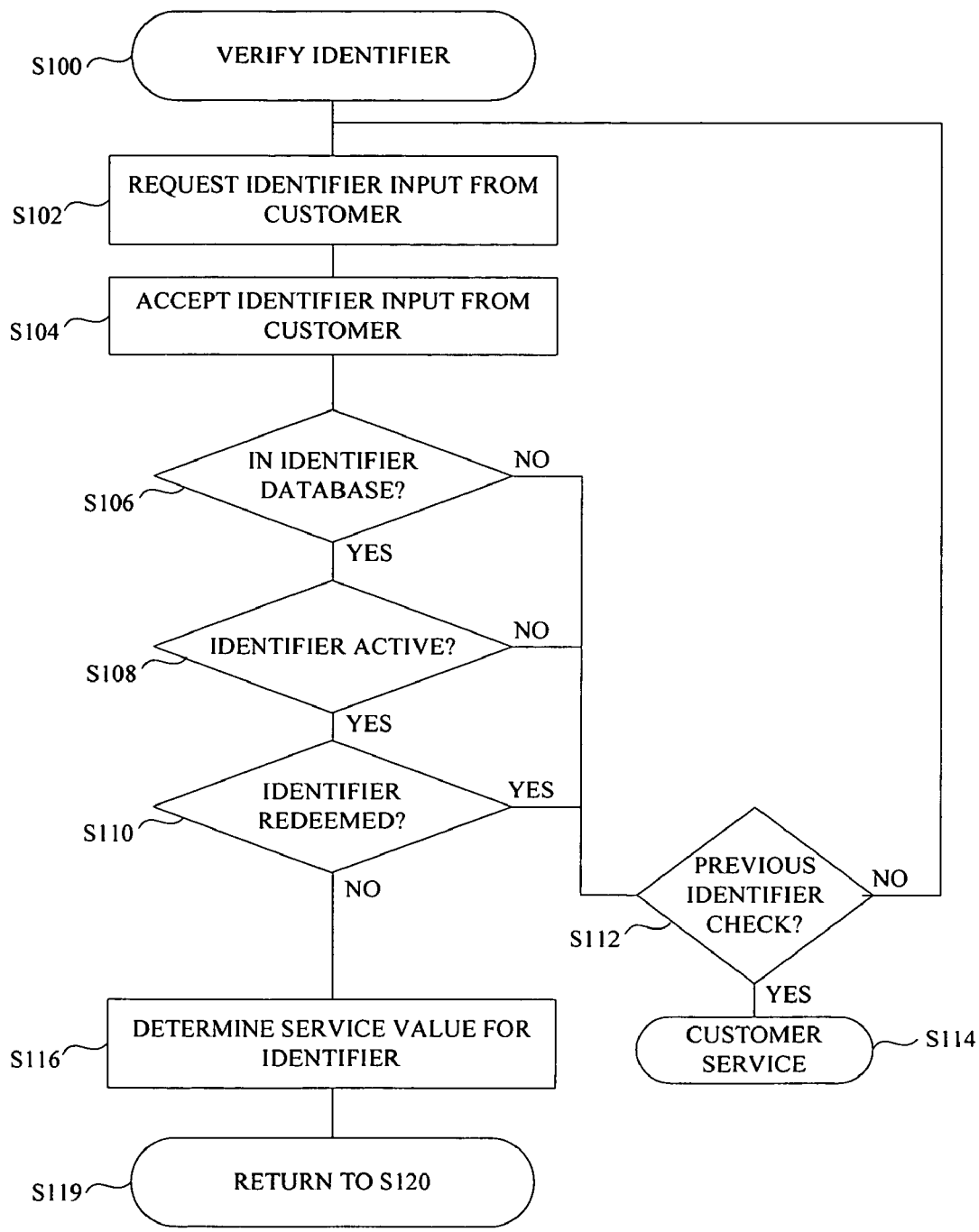
FIG. 3 is a flowchart showing the "verify identifier" step of FIG. 2 in further detail in accordance with one embodiment of the invention.

FIG. 3 is a flowchart showing the "verify identifier" step of FIG. 2 in further detail in accordance with one embodiment of the invention. As shown in FIG. 3, the process continues in step S100, and passes to step S102, wherein the IVR system requests the identifier input from the customer (i.e., voice prompt requesting PIN from card, for example). In step S104, the system accepts the identifier input from the customer (i.e., the PIN provided on the card, for example). Then, in step S106, the system determines whether the identifier input correlates with an identifier from the set of identifiers maintained by the central system. The central system compares the PIN provided by the customer with those kept in the identifier database. If a record containing the PIN is found on the database, the process passes to step S108. If the identifier is found in the database, the system determines whether the identifier is active in step S108. The status of the identifier can be determined by relating a Status Indicator associated with the pertinent identifier record. Thus, when the central system finds the identifier record, it can determine whether a value in the Status Indicator field represents Active or Inactive status. If the identifier is found in the database and is active, the system determines whether the identifier has already been redeemed in step S110. This feature allows the central system to inform the customer that the identifier has already been redeemed. In some circumstances, the customer's communication session with the central system may be ended prematurely, before confirmation of the value insertion procedure. When this occurs, the customer may not be aware that the value insertion function was completed in the prior call. Thus, if the customer had previously called within a certain period (i.e., the last 24 hours), the central system can inform the customer that the value insertion was successful. If the identifier has not been redeemed, the process passes to step S116.

If the identifier cannot be found in the database in step S106, or the identifier is found in the database but is determined to be inactive in step S108, or the identifier is found in the database and is active, but is determined to have already been redeemed in step S110, the process passes to step S112. The system determines whether there has been a previous identifier check in step S112, and if so the process passes to step S114, where the customer is transferred to customer service. A previous identifier check would have occurred if the customer had previously supplied identifier input and the input failed any of the determinations in steps S106, S108 or S110. If there had not been a previous identifier check, the process returns to step S102, where the systems requests that the customer re-enter the identifier input.

For those identifiers found in the system that are active and have not been redeemed, in step S116 the system determines the associated service value for the identifier. The process then passes to step S119, wherein it returns to step S120.

Figure 4:
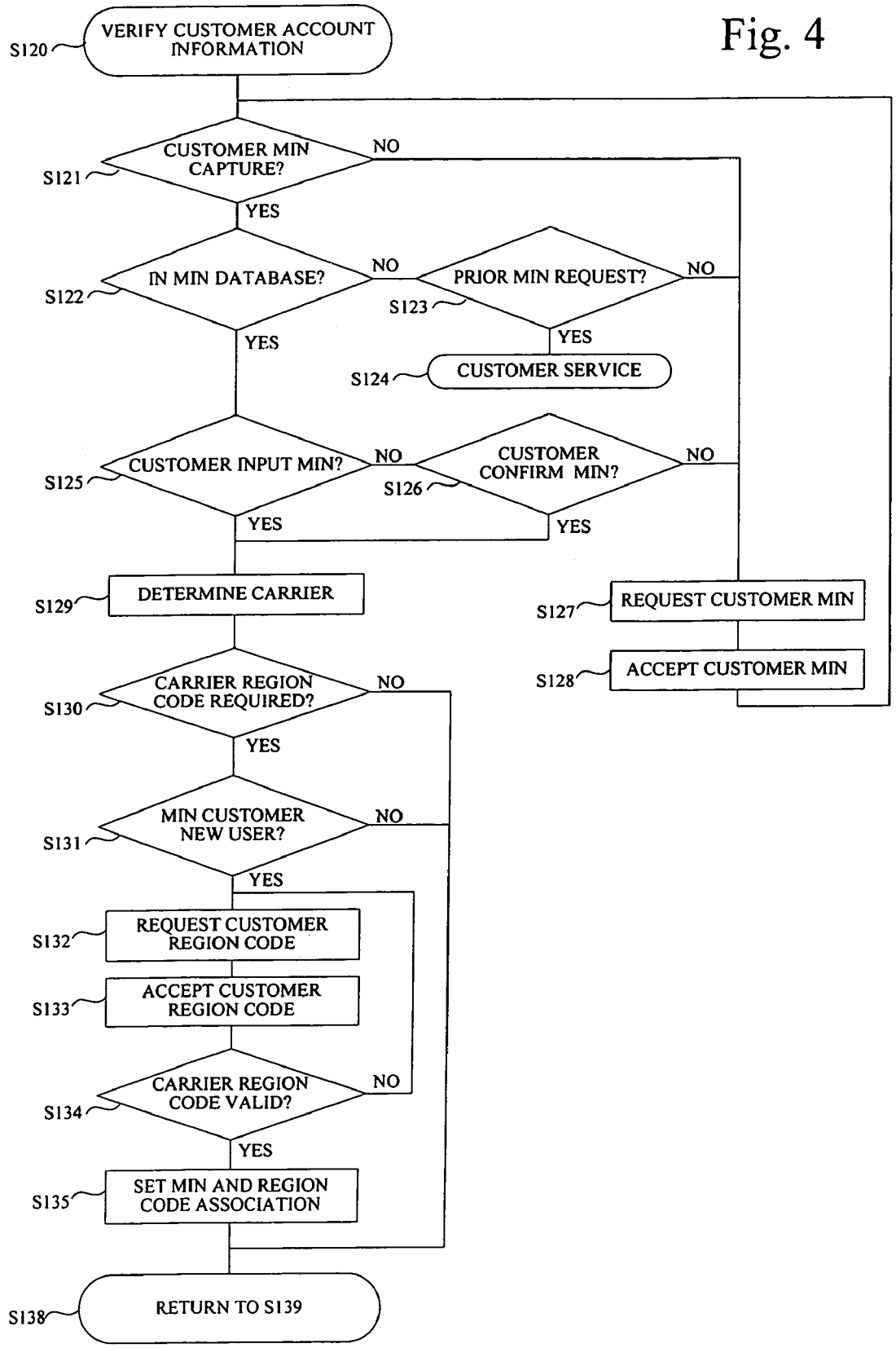
FIG. 4 is a flowchart showing the "verify customer account information" step of FIG. 2 in further detail in accordance with one embodiment of the invention.

FIG. 4 is a flowchart showing the "verify customer account information" step of FIG. 2 in further detail in accordance with one embodiment of the invention. The customer supplies his customer account information to ensure that the service value purchased is credited to the correct customer account, or Mobile Identification Number ("MIN"), at the correct carrier system. As shown in FIG. 4, the process continues in step S120 and passes to step S121. First, the system determines whether the customer MIN was captured when the customer contacted the central system in step S121. The customer's MIN can be captured utilizing Automatic Number Identification ("ANI"), or similar caller ID function. Through ANI, the central system acquires the customer's MIN from the ISDN transmission. Alternatively, the customer may supply his MIN upon request. This would allow the customer to confirm which MIN account the prepaid service value should be credited.

If the customer's MIN has not already been captured, the process passes to step S127. If the MIN has been captured, the process passes to step S122, wherein the system determines whether the customer's MIN can be found in the MIN database. The MIN database is a compilation of existing MINs that includes each MIN, as well as the associated carrier. The MIN database may be stored locally in the central system, or maintained externally in a publicly accessible database, such as Telcordia®. This database may also include one created pursuant to the Wireless Local Number Portability Act. If the MIN is not found in the MN database, the process passes to step S123. In situations when the MIN is not found in the MIN database, the customer may have contacted the central system using a non-wireless phone or other non-telephone connection, the system prompts the customer to enter the MIN that the customer wishes to add the service value. If the MIN is found in the MIN database, the process passes to step S125.

In step S123, the system determines whether the system has previously requested the customer's MIN from the customer. If so, the process passes to step S124, wherein the customer is transferred to customer service personnel. If the customer's MIN has not been previously requested, the process passes to step S127.

In step S125, the system determines whether the customer input his MIN. If so, the process passes to step S129. If not the customer did not input his MIN, the process passes to step S126, wherein the system determines whether the customer MIN has been confirmed. The confirmation includes input from the customer that the MIN identified is the correct account to add the service value. If the MIN is confirmed, the process passes to step S129.

Alternatively, if the customer MIN is not confirmed, the process passes to step S127, wherein the system requests that the customer provide input representing the customer's MIN for which the service value addition is requested. Then, in step S128, the system accepts the customer's MIN input before returning to step S121.

In step S129, the system determines the customer's carrier. The carrier can be determined by locating the MIN identified in the MIN database and relating the associated carrier. Once the carrier is determined, in step S130, the system determines whether the customer must supply a carrier region code based on the customer's carrier. If not, the process skips to step S138. If the carrier region code is required, the system requests the customer's carrier region code in step S132. The carrier region code may be required for carriers that have regional centers that maintain data on the local mobile phone customers. The carrier region code may be represented by the customer's zip code.

In step S133, the system accepts the customer's carrier region code, and the process passes to the step S134. The system determines whether the carrier region code is valid in step S134. The code will be presumed valid if it can be related to a region code maintained in a carrier specific region code database. If the code is simply the customer's zip code, the system can determine the appropriate carrier region by referring to the carrier database. If the code is not valid, the process returns to step S132, wherein the system requests reentry of the region code. If the code is valid, the process passes to step S135, wherein the system sets an association between the customer's MIN and the carrier region code, to avoid later requests of the code upon subsequent interactions. The process then passes to step S138, wherein it returns to step S139.

Figure 5:
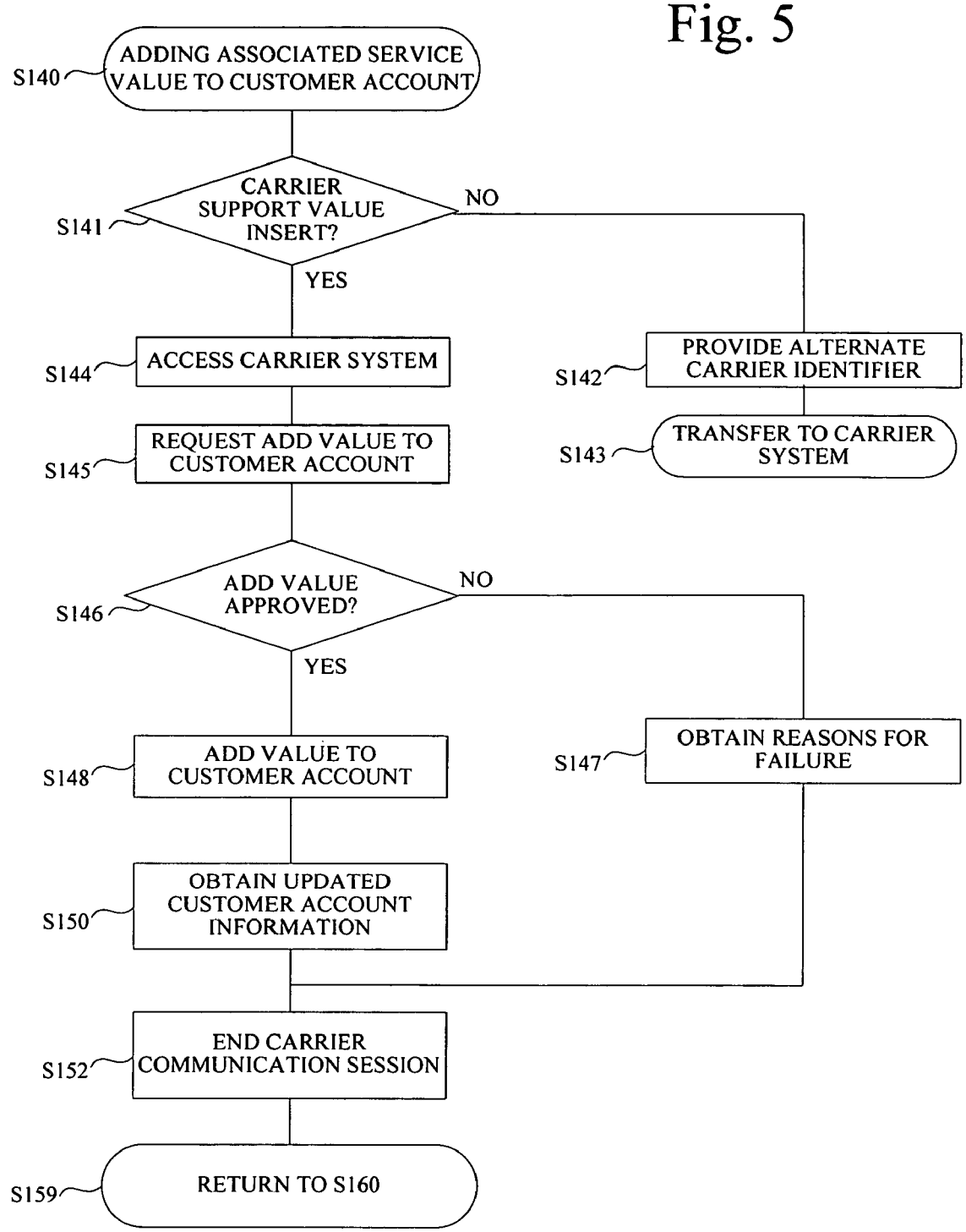
FIG. 5 is a flowchart showing the "adding associated service value to customer account" step of FIG. 1 in further detail in accordance with one embodiment of the invention.

After receiving the customer's request, in step S140, the process includes adding the associated service value to the customer account. FIG. 5 is a flowchart showing the "adding associated service value to customer account" step of FIG. 1 in further detail in accordance with one embodiment of the invention. The process continues in step S140 and then passes to step S141, wherein the system determines whether the customer's carrier support value insertion of service value into its customers' accounts. If the carrier does support direct value insertion, the process passes to step S144, wherein the system access the carrier system. Then, in step S145, the system requests approval from the carrier system to add the service value associated with the identifier to the customer's account. In step S146, the system determines whether the add value request is approved. If so, the process passes to step S148, wherein the system adds the service value to the customer's account, and then passes to step S150, wherein the system obtains updated customer account information from the carrier system. This updated account information may include the new account balance, as well as the account's expiration date, for example. The process then passes to step S152.

However, if in step S146, the system determines that the add value request was not approved, the process passes to step S147, wherein the system obtains the reasons from the carrier system that the value insertion was not approved. The process then passes to step S152, wherein the system ends the communication session with the carrier system. The process then passes to step S159, wherein it returns to step S160.

For those carriers that do not support direct value insertion, in step S142, the system provides the customer with an alternate carrier identifier. This carrier identifier operates similarly to the identifier used with the central system, however, the carrier identifier must be redeemed through communication with the carrier system. These carrier identifiers may be maintained in a separate carrier identifier database. Accordingly, in step S143, the system transfers the customer to an IVR system managed by the carrier system to complete the value redemption.

Figure 6:
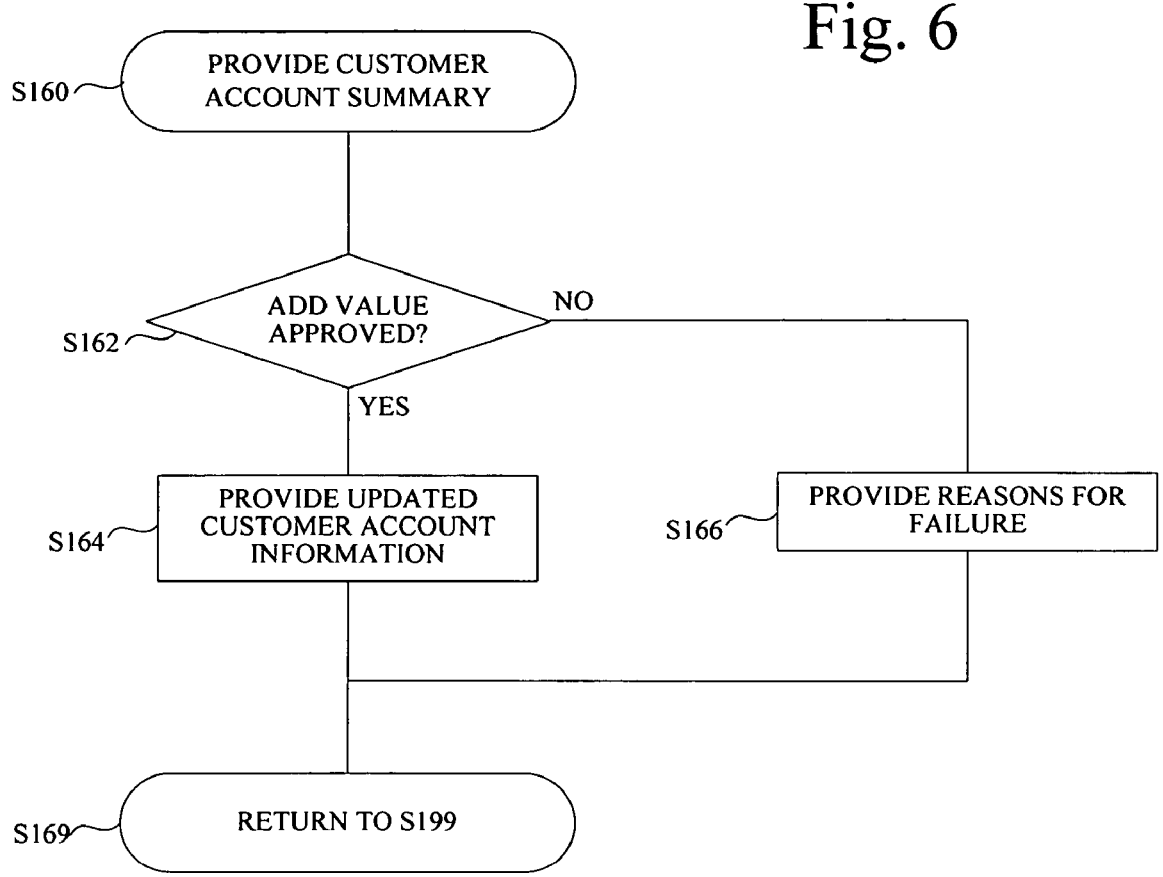
FIG. 6 is a flowchart showing the "provide customer account summary" step of FIG. 1 in further detail in accordance with one embodiment of the invention.

Returning to FIG. 1, in step S160, the process includes providing the customer with a customer account summary. FIG. 6 is a flowchart showing the "provide customer account summary" step of FIG. 1 in further detail in accordance with one embodiment of the invention. The process continues in step S160, and then passes to step S162, wherein the system determines whether the value insertion was approved by the carriers system. If so, the process passes to the step S164, wherein the system provides the updated customer account information to the customer. The process then passes to step S169. If the value insertion was not approved, the process passes to step S166, wherein the system provides the customer with the reasons for the denial of the request. These reasons may include that the customer's balance in the customer account is already too high or exceeds a predefined limit, the account cannot be found by the carrier, the account has been cancelled or any unspecified carrier error. The process then passes to step S169, where it returns to step S199. Once the system provides the customer with the customer account summary, the process passes to step S199, where it ends.

It should be appreciated that the methods described herein may be adapted such that each indicia of an identifier distributed may not have a predetermined associated service value. In this respect, the indicia would include the identifier, however, the customer would be allowed to select a service value to purchase for the card. Therefore, upon distribution of the card, the customer would select a service value, such as $25, for insertion into the record at the central system. The communication from the merchant would notify the central system of the amount purchased, which would then be inserted into the associated service value field for the record.

An Illustrative Communication Service Value System

Figure 7:
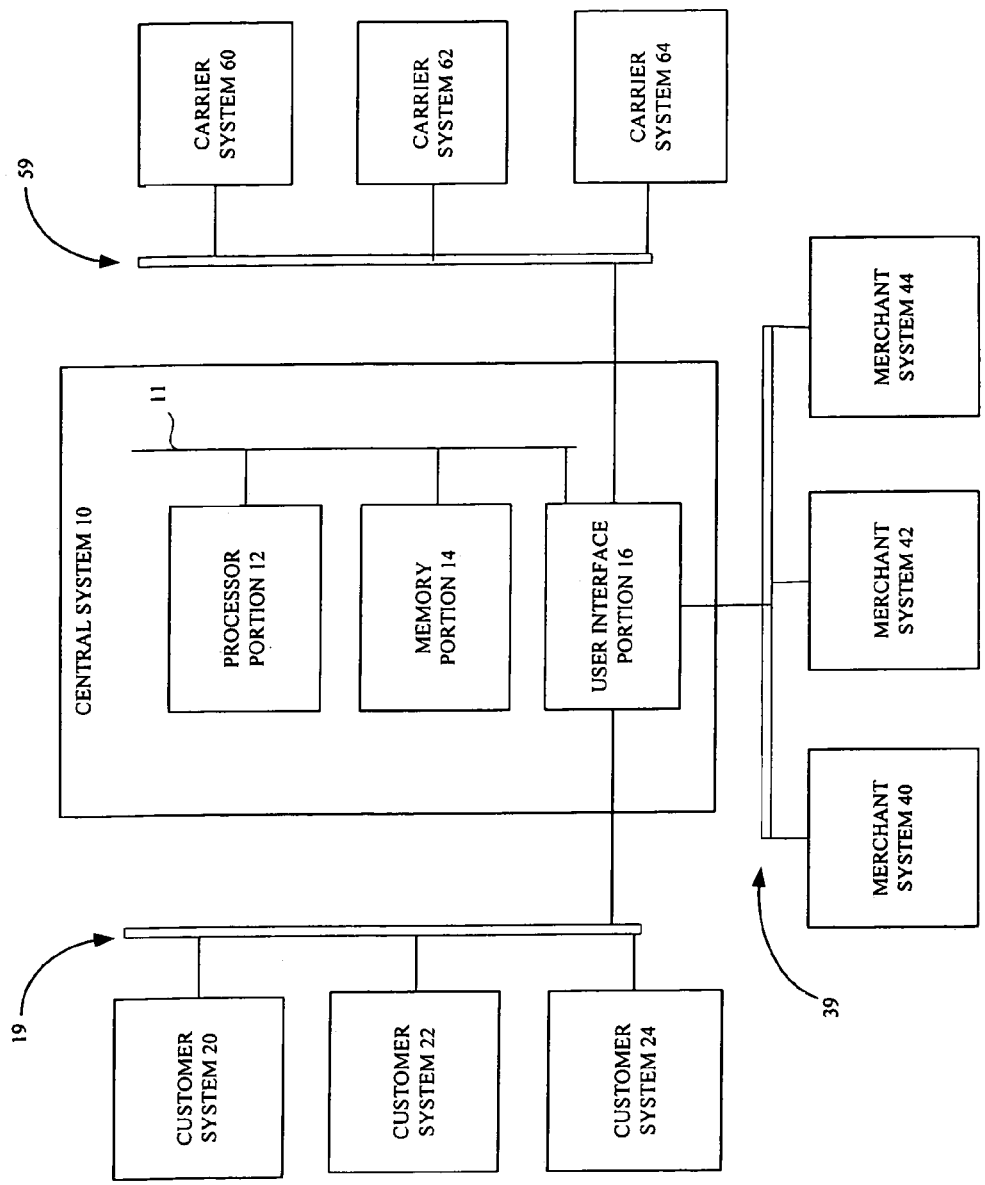
FIG. 7 is a diagram showing an illustrative system for supplying communication service in accordance with one embodiment of the invention.

As described above, FIG. 7 is a diagram showing an illustrative system for supplying communication service value in accordance with one embodiment of the invention. FIG. 7 illustrates a central system 10, a plurality of customer systems 20, 22, and 24, a plurality of merchant systems 40, 42, and 44, and a plurality of carrier systems 60, 62, and 64. Each customer system 20, 22 and 24 is in selective communication with the central system 10 through customer network 19. Each merchant system 40, 42 and 44 is in selective communication with the central system 10 through merchant network 39. Each carrier system 60, 62 and 64 is in selective communication with the central system 10 through carrier network 59. It should be appreciated that customer network 19, merchant network 39 and carrier network 59 may be the same network in some embodiments of the invention.

The central system 10 comprises a processor portion 12 for processing input from and generating output to the various customer, merchant and carrier systems in communication with the central system 10, a memory portion 14, the processor portion 12 retrieving data from and storing data for use by the central system 10 in the memory portion 14, and a user interface portion 16 accepting input from and transmitting output to the various customer, merchant and carrier systems in communication with the central system 10. Each of processor portion 12, memory portion 14 and user interface portion 16 are connected to and in communication with each other through a data bus 11. It should be appreciated that the IVR system may utilize components from each of the processor portion 12, memory portion 14 and user interface portion 16.

The processor portion 12 monitors and controls the various operations of the central system 10. Initially, the processor portion 12 processes the information provided by the merchant system 40 when confirming the indicia distribution and the customer system 20 when accessing, or making requests of, the central system 10. The customers accessing the central system 10 provide their input through the use of user interfaces presented by the user interface portion 16, which includes the voice prompts and options presented by the IVR system.

The memory portion 14 serves as a memory store for a wide variety of data used by the processor portion 12, as well as the other components of the central system 10. For example, in one embodiment, the memory portion 14 contains the various databases of identifiers and associated service values, MINs, carriers, and other information needed by the central and IVR systems. It should be appreciated that the various memory components contained in the memory portion 14 may take on a variety of architectures as is necessary or desired by the particular operating circumstances. Further, the various memory components of the memory portion 14 may exchange data or utilize other memory component data utilizing known techniques such as relational database techniques.

The user interface portion 16 provides the interface through which the user can provide input to and receive output from the central system 10. The user interface portion 16 generally provides interaction capabilities for communicating with the customer, merchant and carrier systems. The user interface portion 16 is controlled by the processor portion 12, or components thereof, to interface with a customer or other operating system, including inputting and outputting data or information relating to the central system 10. The user interface portion 16 also provides the interface between the system administrator, the central system 10, and other remote systems. A system administrator mainly utilizes the user interface portion 16 to manage the storage of data and information in the memory portion 14, as well as provide updates to the central system 10 applications and functions.

In operation, a customer utilizing a suitable customer system 20 accesses the central system 10 through customer network 19. The customer system 20 may be any suitable processing machine, such as a mobile phone, as well as a computer accessing the Internet, personal digital assistants (PDAs) or other wireless communication device, networked to customer network 19. The merchant system 40 may be any suitable processing machine, including a transceiver device (i.e., a verifone terminal, for example) capable of receiving input from the central system, printing indicia or other information, performing smart card or magnetic stripe card reader or bar code scanner functions, and sending output to the central system 10. Accordingly, in one embodiment of the invention, to activate an identifier upon payment, the card is swiped through an appropriate card interface on the merchant transceiver, which initiates a network connection to the central system 10, wherein the central system 10 activates the identifier in the appropriate database.

The user interface portion 16 also transmits data to the customer system 20 to present a user interface on the customer system 20 for accepting input and allowing the customer to submit output to the central system 10. Although these user interfaces have been described with respect to an IVR system, alternate user interfaces may be presented on an Internet web page whereby customers access the page and provide the necessary redemption information on an appropriate form.

Although several customer systems and vendor systems are shown in FIG. 7, it should be appreciated that in some embodiments of the invention, there may be only one customer system and one vendor system, each in selective network communication with the central system 10.

The user interface portion 16 accepts the customer request for value insertion from the customer system 20, including the identifier input and customer account input. The processor portion 12 verifies the identifier input with the identifier database maintained in the memory portion 14, and then verifies the customer account input with the MIN database, either maintained locally in the memory portion 14 or externally in a publicly available database of MINs. The user interface portion 16 then communicates with a carrier system 60 to complete the value insertion process before providing the customer with a customer account summary.

It should also be appreciated that the invention may include a device for distributing communication service value. Such a device may include a distribution terminal (i.e., a verifone terminal-like device or a vending machine-like apparatus) that allows a customer to select a prepaid service value for purchase, and make payment for the service value. The terminal would include a product selection portion for presenting the various service value denominations available (i.e., any user interface for accepting the customer's selection, for example), a payment portion for receiving payment from the customer (i.e., through cash, or magnetic stripe card or smart card readers, for example), a communication portion for notifying the central system of the sale of the indicia and the need to activate the associated identifier (i.e., a modem, for example), and a delivery portion for providing the customer with the indicia of the identifier (i.e., a mechanical card delivery system or printer means to provide a printout of the indicia, for example).

As described above, FIGS. 1–6 illustrate various embodiments of the method of the invention. FIG. 7 represents an illustrative embodiment of the system of the invention. It should be appreciated that the system of the invention or portions of the system of the invention may be in the form of a "processing machine," such as a general purpose computer or other network operating system, for example. As used herein, the term "processing machine" is to be understood to include at least one processor that uses at least one memory. That at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including a microcomputer, mini-computer or mainframe for example, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the process of the invention.

It is appreciated that in order to practice the method of the invention as described above, it is not necessary that the processors and/or the memories of the processing machine be physically located in the same geographical place. That is, each of the processors and the memories used in the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, a dedicated circuit, IP based connection, the Internet, Intranet, Extranet, LAN, WAN, VPN, an Ethernet, or any client server system that provides communication, for example. Such communications technologies may use any suitable protocol such as TCP/IP, UDP, OSI, SNA, X.25, ISO 85/83, XML or SOAP, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may comprise a series of Interactive Voice Responses, or take the form of a dialogue screen, for example. A user interface may be in the form of a web page or other interactive application presented on a customer system by the customer's browser. The web page or application could include fields for accepting data and transmitting data to the advertising marketing system for storage. A user interface may also include any of a mouse, touch screen, keyboard, keypad, card slot, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

Figure 8:
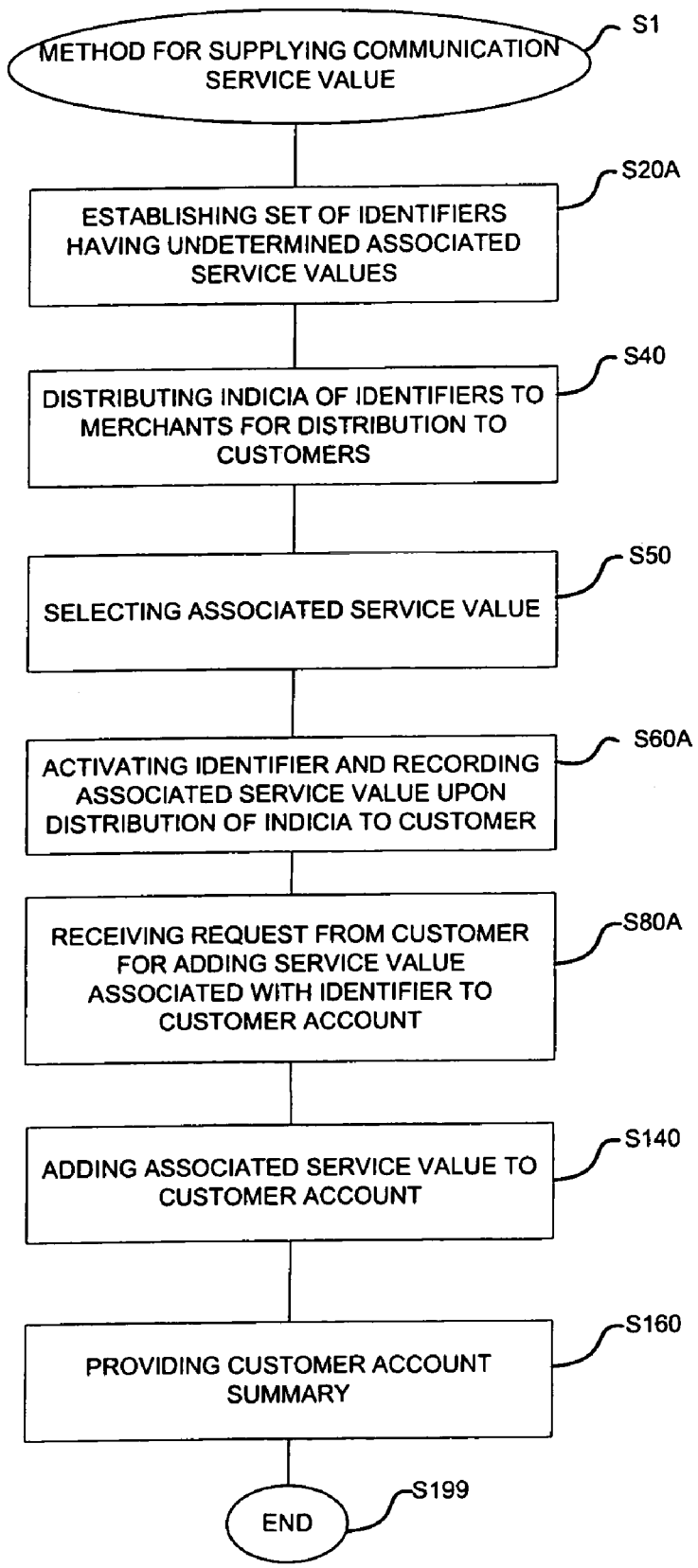
FIG. 8 is a flowchart showing a method for supplying communication service according to an embodiment of the invention.

FIG. 8 is a flowchart showing a method for supplying communication service. This method is very similar to the method of FIG. 1, described above. However, in this embodiment, the associated service value is not initially pre-established, but instead it is determined when it is selected by a customer at the time of distribution of the identifiers to the customer. In this respect, the indicia would include the identifier; however, the customer would be allowed to select a service value, such as $25 or $50, for insertion into the record at the central system. As previously noted, the service value could alternately be a another unit of service usage, such as a number of minutes. The communication from the merchant would notify the central system of the amount purchased, and this information would then be inserted into the associated service value field for the record.

Thus, as shown in FIG. 8, a set of identifiers having undetermined associated service values is established, in step S20A. Then in step S40, as also shown in FIG. 1, the indicia of identifiers to merchants for distribution to customers is distributed. Unlike in FIG. 1, the process proceeds to step S50, where the customer selects the associated service value, such as $10, $25, or $50. Then in step S60A, the identifiers are activated and the associated service value is recorded when the indicia is distributed to the customer. In step S80A, the request from the customer for adding service value associated with the identifier to the customer's account is received. This step is further elaborated in FIG. 9, discussed below. Finally, the associated service value is added to the customer account in step S140, and the customer account summary is provided in step S160.

Figure 9:
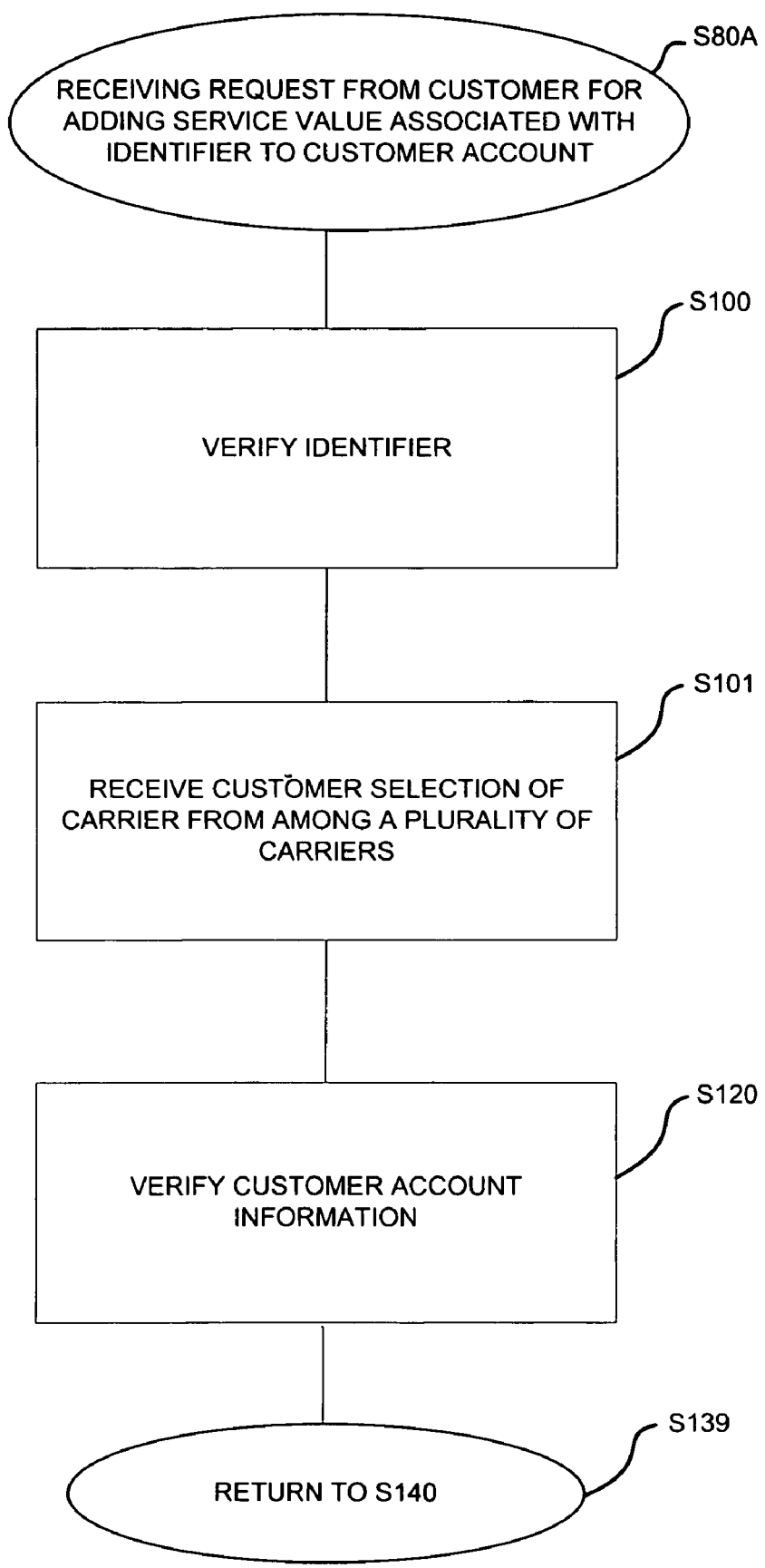
FIG. 9 is a flowchart showing the "receiving request from customer for adding service value associated with identifier to customer account" step of FIG. 8 in further detail in accordance with one embodiment of the invention.

FIG. 9 is a flowchart showing the "receiving request from customer for adding service value associated with identifier to customer account" step of FIG. 8 in further detail in accordance with one embodiment of the invention. This flowchart further elaborates step S80A shown in FIG. 8. The flowchart of FIG. 8 follows the same process as described in FIG. 2, above. However, in this embodiment, it is explicitly shown that after the identifier is verified, in step S100, the customer selects a carrier for service from among a plurality of carriers is received, in step S101. The process then proceeds with step S120 as in FIG. 2 when the customer account information is verified.

FIGS. 10–13 illustrate examples of entity trees that may benefit from the system and techniques of the present invention. For simplicity of illustration, the customer/distributor layer at the top is omitted. Each distributor can have subordinate to it any of the illustrated types of structures. Note that in each case, a merchant M2 is at the top, with a layer of locations 3 just above a layer of terminals M12.

Figure 10:
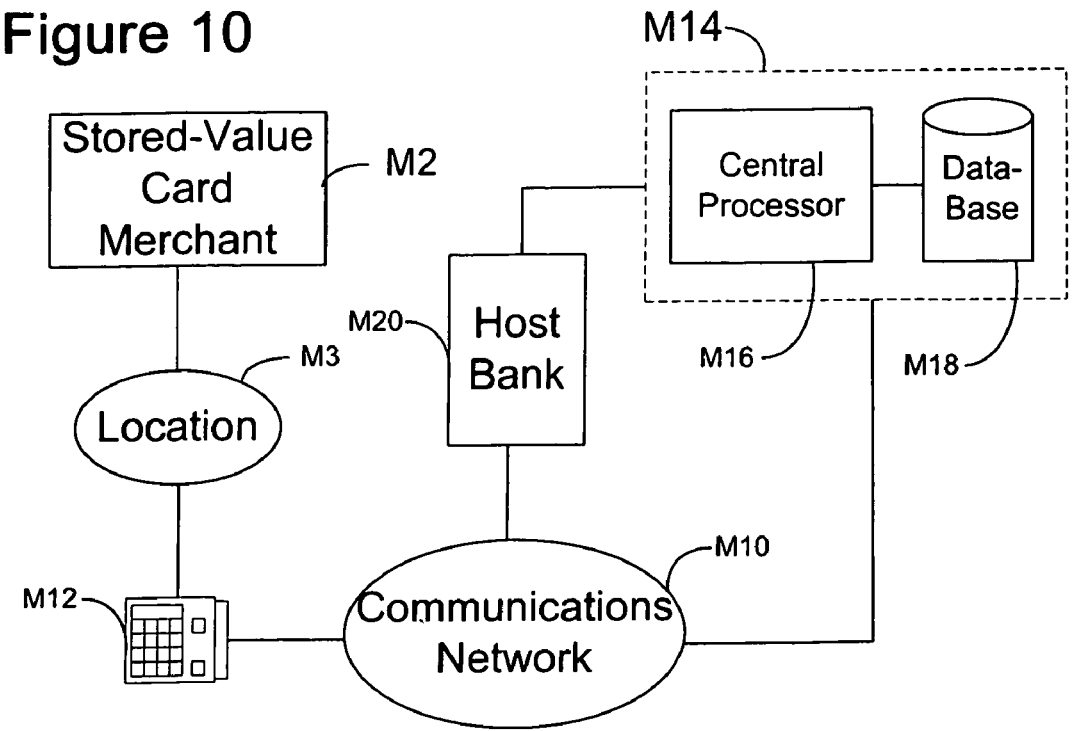
FIGS. 10–13 respectively illustrate schematic block diagrams showing how various exemplary stored-value card user trees, as shown in FIGS. 10–12, may be connected via a communications network to a remote stored-value card data management system embodying the present invention.
Figure 11:
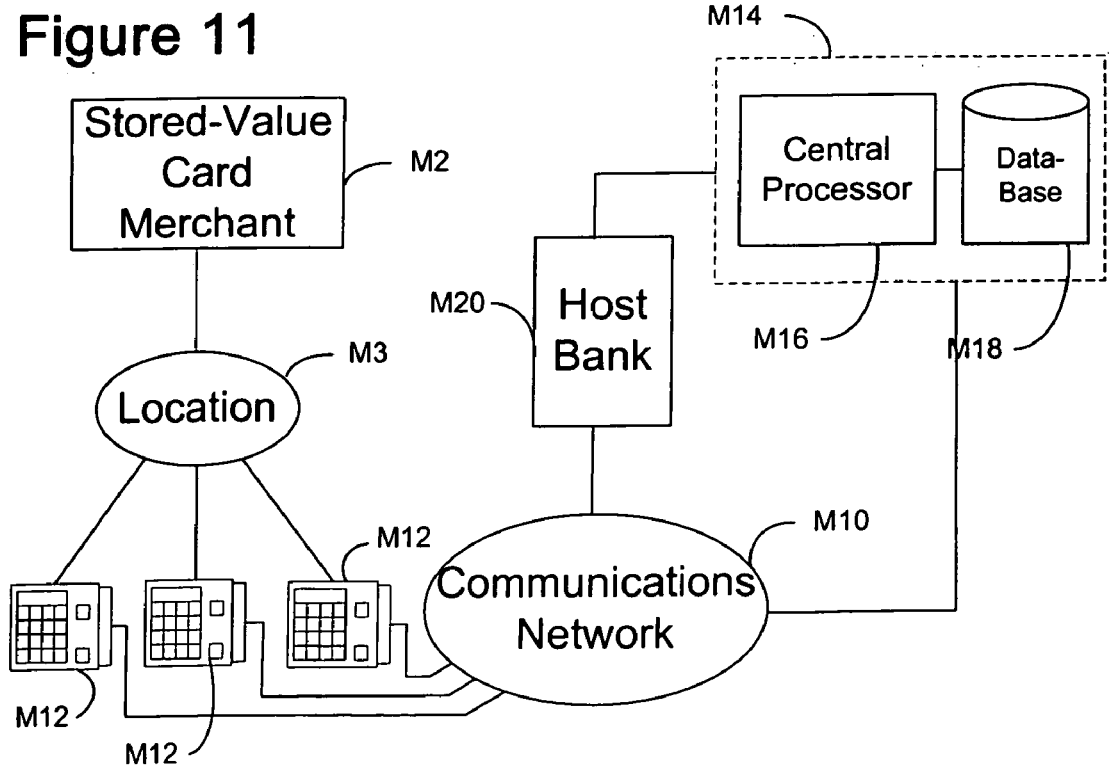
Figure 12:
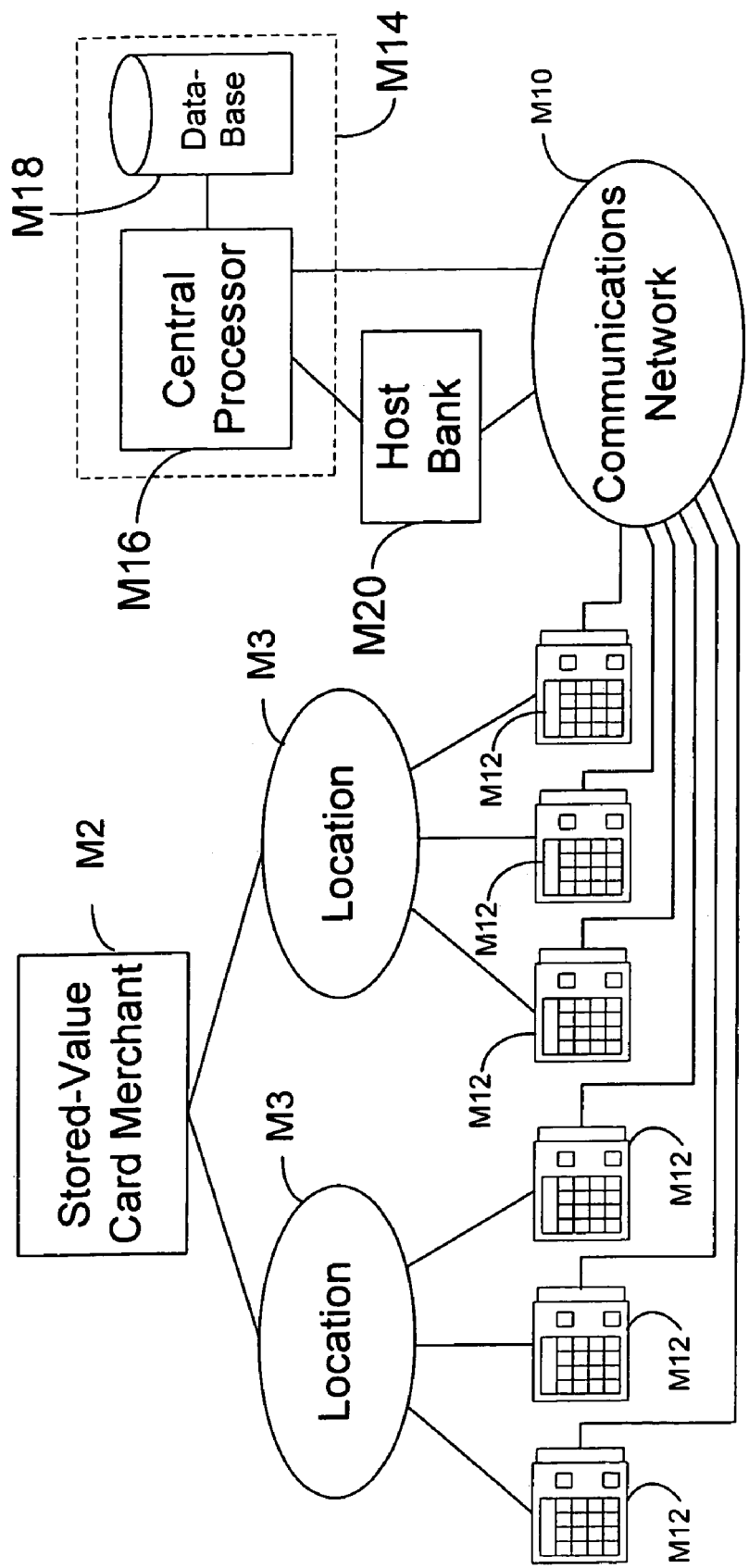

As shown in FIGS. 10 through 12, by way of a communications network M11, e.g., a public switched phone network, a wireless network, a dedicated data circuit such as a dedicated phone line, a credit or debit card network, the Internet, an intranet, etc., over which credit or debit card transactions are authorized or denied, and/or a point-of-sale terminal M12, e.g., a credit or debit card terminal, is used to send an authorization request to a stored-value card data management system 14M, such as may be managed and operated by the assignee of the present invention. System 14M comprises a central processor M16 coupled to a database M18. The central processor M16 can be a host computer, a computer server, a computer system with software applications that receive transactions and process them according to preset rules, and any other computer system. The database M18 stores a plurality of records including stored-value card data for each stored-value card issued by the assignee of the present invention. The database can also store information identifying trusted sources for making stored-value card processing requests, such as requests to activate a stored-value card, and it can additionally store information identifying trusted communications networks for carrying or otherwise transmitting stored-value card processing requests. The identification information can be a telephone number, a static IP address, a password, a PIN, a merchant and/or terminal ID, or another unique code that can be associated with a particular user, merchant terminal, or communications network. The code may be chosen by a user at the terminal, randomly assigned, or selected from a list of codes by the central processor M16 and assigned to the terminal. It will be appreciated that in the case of a credit or debit card network, each stored-value card transaction request is expected to be handled, on average, within a certain time period such as approximately two seconds, or else one could lose its certification to use that network.

A respective requesting terminal, using the communications network M10, may send an authorization request through a suitable host bank M20 to the central processor. The authorization request could also be routed straight to the communications network M10 without passing through a host bank M20. FIGS. 10 through 12 show an exemplary link architecture between the communications network and the central processor, optionally through the host bank. That is, the link architecture allows communication of card related data from the merchant, to the communications network, which in one exemplary embodiment would be the Visa network for a Visa-routed transaction, to the host bank, and then to the central processor. It will be appreciated that other link architectures may be implemented, such as a host-to-host architectural connection. In this case, the communications network, such as a dedicated link or the internet, would be directly between a merchant's "host" system and a "host" system of the assignee of the present invention. Thus, the present invention is not limited to applications that require a host bank being that a host-to-host connection does not require any host bank or Visa network to transfer the card-related data to the central processor.

The authorization request may include information about the card swiped and the terminal used to swipe it, such as the electronic signature of that terminal, an IP address of the terminal, a phone number of the terminal, or a password provided by the terminal. It should be appreciated that other methods may be used to capture identification of the card besides swiping it; for instance, the information can be barcode-scanned or entered manually at a keypad of a computer. Further, merchant terminals M12 may be any system that can transmit card identifier information over a communications network. Thus, merchant terminals M12 can be telephones, electronic cash registers, credit card machines, fax machines, computers, or other devices that can receive and transmit information.

Figure 13:
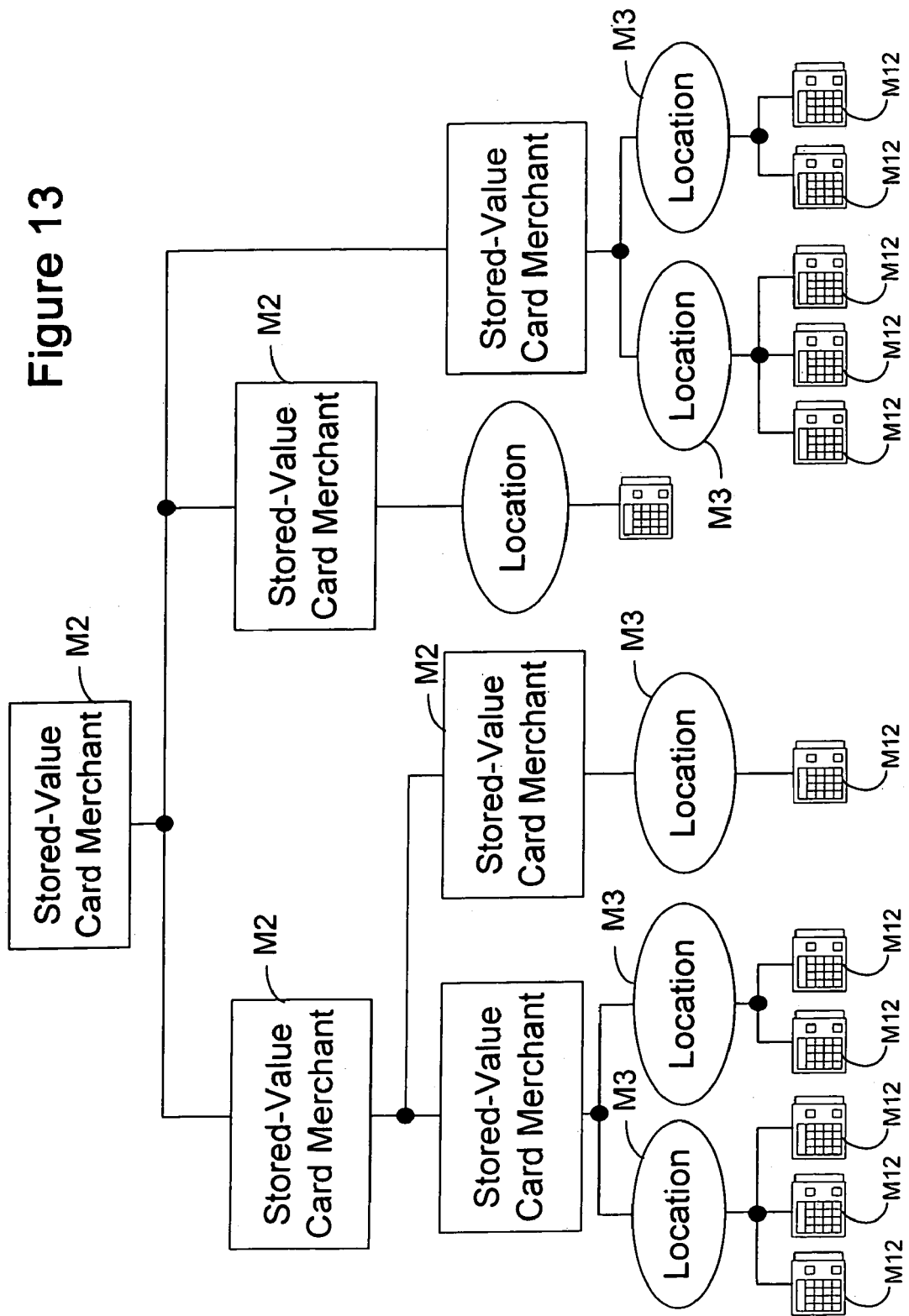

In another aspect of the system of the present invention, as shown in FIGS. 12 and 13, merchants and terminals can be divided into groups, membership of which varies depending on whether the context of the grouping is for the purpose of executing any specific action out of a set of actions that a respective user may execute, such as card activation, billing, commission payments, reporting, inventory management, etc. For example, terminal A from Merchant X may be in activation group I with terminal B from merchant Y, yet for billing purposes the two terminals may be in different groups. Also, Merchant X may be affiliated with terminals A, B, and C, and thus A, B, and C may be classified in the same group. Merchant X may also be grouped with Merchant Y and its terminals D, E, and F. In this way, terminals A–F may be in the same activation group for instance. The central processor can be preconfigured to determine whether a terminal is a trusted source based on whether the requestor is in the same group as another terminal or merchant that is considered a trusted source.

Terminals in a given group can share a communications network. For instance, all the terminals in a given group may share a dedicated data line that connects them to the central processor. Requests can then be authorized when the central processor recognizes that the request was received via the dedicated data line and determines that the dedicated data line is a trusted source. Similarly, terminals in a given group can share a set of static IP addresses. In one embodiment, terminals are assigned static IP addresses when they log on to a server operated by an entity associated with the group. The server entity assigns a terminal an IP address selected from a defined set of IP addresses. Each of the IP addresses in the defined set is a trusted source and therefore has identifying information stored at the database.

Management and definition of these groups is the responsibility of a module configured to store in the database a list of trusted sources and trusted communications networks. The database can also include a table indicative of the set of actions that a respective user may execute from a respective terminal.

FIG. 13 shows an exemplary entity tree for a store-value card merchant M2. One or more merchant terminals M12 are located at a particular location M3 of a merchant, such as a particular store location. One or more locations M3 will be associated with a stored-value card merchant M2. Stored-value card merchants M2 may then be affiliated or otherwise associated with other stored-value card merchants M2, which may in turn have further affiliations with additional stored-value card merchants M2. By means of such a stored-value card merchant M2 network, a given merchant M2 may be associated with one or more locations M3 and terminals M12 through other merchants M2. For the sake of simplicity of illustration, blocks representing the stored-value card data management system and other associated blocks are not shown in the user entity trees shown in FIG. 13. It will be appreciated, however, that each of such user entity trees will be similarly interconnected to the stored-value card data management system 14M as exemplarily illustrated in FIGS. 10 through 12 or as further described herein.

Figure 14:
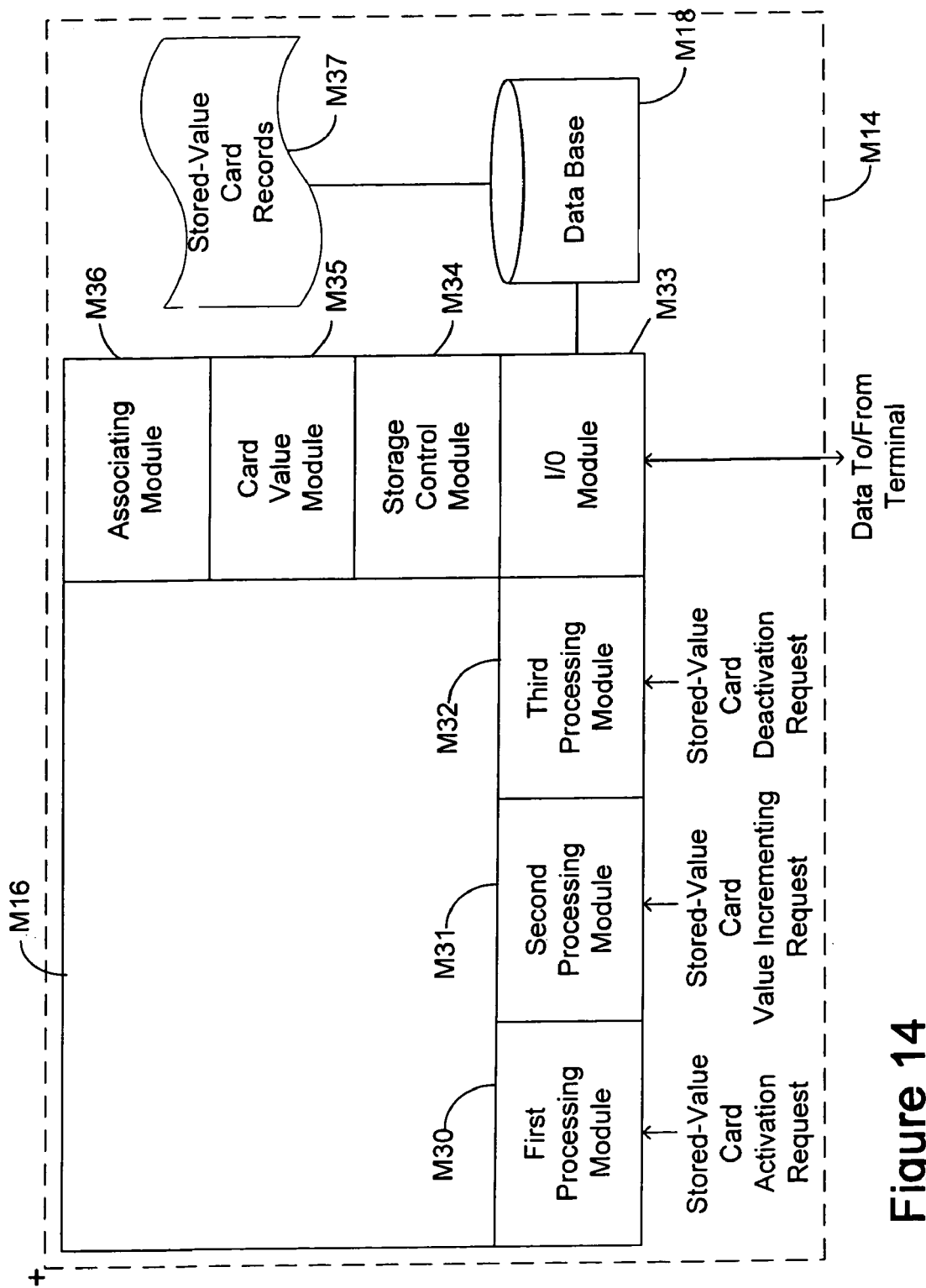
FIG. 14 is an exemplary modular architecture of the telecommunications card data management system shown in FIGS. 10–13.

FIG. 14 illustrates further details in connection with stored-value card data management system M16. As shown in FIG. 14, central processor M16 includes a storage control module M34 that allows for storing in database M18 a plurality of stored-value card records M37 comprising stored-value card data for each stored-value card, information identifying trusted sources for making stored-value card processing requests, and information identifying trusted communications networks for carrying or transmitting stored-value card processing requests. An associating module M36 allows for associating in each stored record respective identifiers that uniquely match a respective stored-value card and a respective terminal, or to match a card or terminal with other associated identifier information. A card value module M35 allows for defining in each stored record a parameter corresponding to the value of each respective stored-value card. That parameter could comprise a monetary amount corresponding to the value of each respective stored-value card or such parameter could comprise time units corresponding to the value of each respective stored-value card, or both. The card value module M35 may also allow for defining the parameters or methods by which a card's value can be changed.

Stored-value card data transmitted over the communications network may be received by input/output module M33 so that a first processing module M30 may process a request of stored-value card activation to the central processor from a respective requesting terminal. The central processor thus allows for accepting or declining an activation request, or other processing request, based on whether the request is from a trusted source or whether the request is transmitted over a trusted communications network.

The processing modules may also comprise modules for changing value, refreshing value, redeeming value, switching the value to another product, service, or currency, or otherwise changing the status of the stored-value card. Other processing modules can be considered. The refreshing module may change the value of the card back to the card's original value. Alternately, the refreshing module may add the card's original value to the current value of the card. For instance, via the refreshing module, a card with a current value of $15 and an original value of $20 could be increased to $20 (original value) or to $35 (current value plus original value), depending on the type of refreshing module. Generally speaking, values can be changed in predetermined increments (like $10) or any amount that is not predetermined. The redeeming module may refund to the customer the value of the card or a portion of the value of the card, or it may provide a monetary or other credit to the customer's account. It may also convert the value of the card into other goods or services offered by the merchant, merchant partner(s), or any other entity associated with the sale of the card, including the central processing station.

In one aspect of the present invention, the stored-value card may only be authorized if the request is made by any of a set of trusted sources, or made through a communication that travels over a trusted communications network. Through means described above, terminals that are trusted sources can be associated with respective identifiers by the associating module M36. However, trusted sources may not have any associated identifiers before a given transaction; instead, trusted sources may be verified to be trusted sources through means described herein.

As further shown in FIG. 14, data from the terminal is received at the I/O module M33. In one embodiment, information about the communications network used to make the request can be identified to the first processing module M30 based on the source of the request signal received at the I/O module M33. For instance, a dedicated data line may have a dedicated input at the I/O module M33, and requests made over the dedicated line will therefore be recognized to be transmitted by the dedicated data line because they are received at the I/O module M33 through the dedicated input. Alternately, a dedicated data line can carry or add identification information as an addition to the request communication. For instance, a dedicated data terminal can be preconfigured to transmit the series of numbers "1234567" before or after every merchant terminal communication in order to identify that the merchant terminal communication is being transmitted over the dedicated data line. In this embodiment, the central processor M16 can then determine that the request was made over a dedicated line by analyzing the information identifying the dedicated data line.

A first processing module M30 configured to process a request of stored-value card activation will analyze this data and send back either an authorization or a disapproval to the requesting terminal. For instance, a first processing module M30 can access the database through the I/O module M33 and compare the information of the terminal with a list of trusted sources stored in the database. If the information of the terminal matches a trusted source data entry in the database, the request will be authorized. If authorized, a database coupled to the central processor can be updated to reflect any authorization or disapproval. A similar process can be used when information is received over a trusted communications network. The first processing module M30 identifies the communications network used to make the request and grants the request if it determines that the communications network is a trusted one. The first processing module M30 can make this determination by itself or by comparing identification information of the communications network to a list of trusted communications networks stored at the database M18.

As further shown in FIG. 14, a second processing module M31 allows for processing a request for changing the value associated with a respective stored-value card. The request is transmitted over the communications network to the central processor from a respective requesting terminal. The central processor thus further allows for accepting or declining the change value request based on whether the respective identifiers stored in the record for the stored-value card whose associated value is to be changed match the identifiers actually transmitted by the requesting terminal for that stored-value card and terminal. A third processing module M32 allows for processing a request of stored-value card deactivation to the central processor from a respective requesting terminal. In this case, the central processor is configured to accept or decline the deactivation request based on whether the request is from a trusted source or whether the request is transmitted over a trusted communications network.

Figure 15:
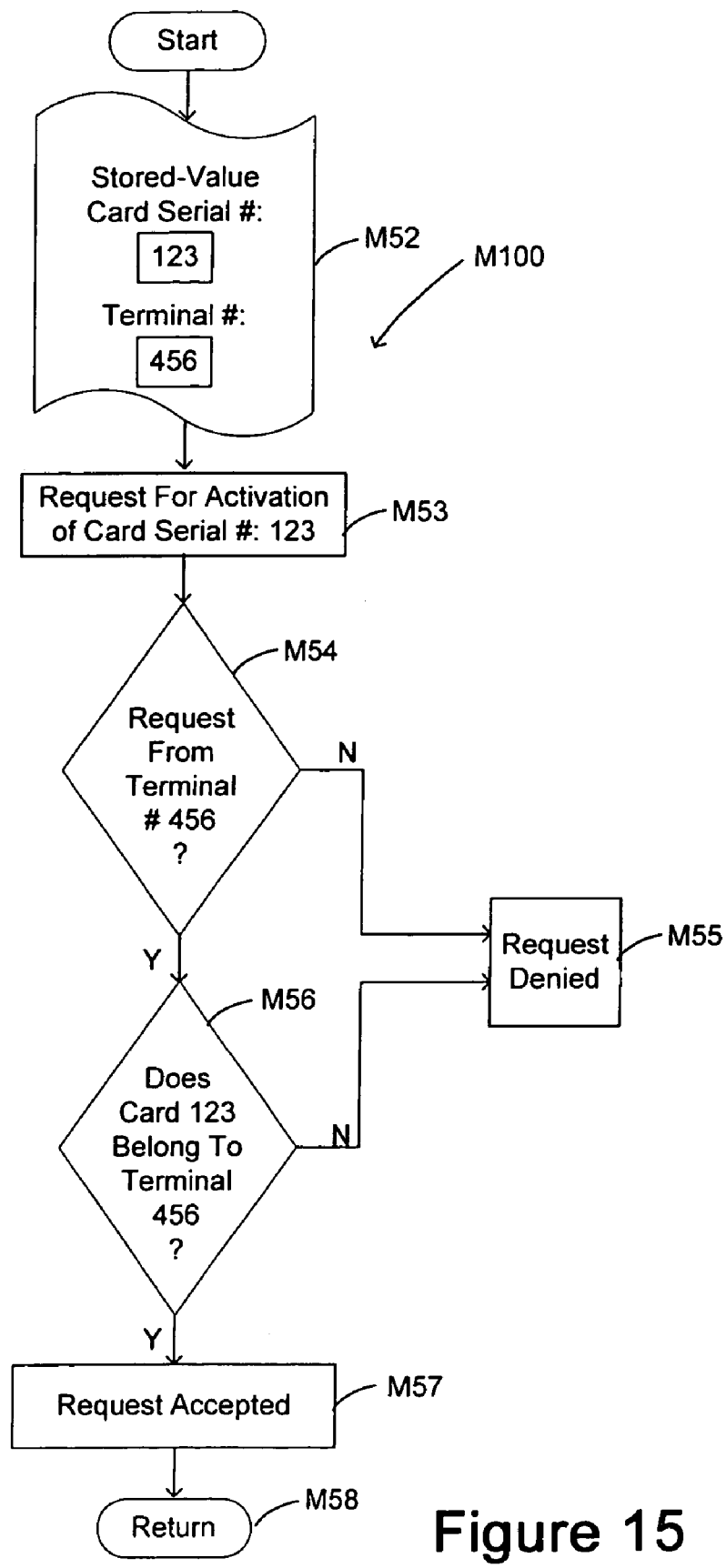
FIG. 15 is an exemplary flow chart illustrating one aspect of the present invention as may be implemented by the system of FIG. 14.

FIG. 15 illustrates an exemplary flow chart M100 such as may be implemented by a stored-value card data management system embodying one aspect of the present invention. The method described in this flowchart is preferably used when a requesting terminal has already been assigned an associated identifier, such as the number 456 as used in the following example. As shown in step M52, a stored-value card serial No. 123 is associated with terminal No. 456. In step M53, a request for activation of stored-value card serial No. 123 is processed. In one embodiment, it may be processed as follows. A verification module would allow for determining whether that request came from terminal No. 456, as in step M54. Then the verification module determines whether card 123 has been assigned to the location containing No. 456, as shown in step M55. If the verification module determines that in fact such request was generated from terminal No. 456, and card 123 has been assigned to the location containing terminal 456, then the central processor would generate a message indicating that the request has been accepted, as in step M57. If the verification module determines that the requesting terminal is other than No.

456, or if the card is not assigned to the location, then a message would be issued declining the transaction, as shown in step M56.

Figure 16:
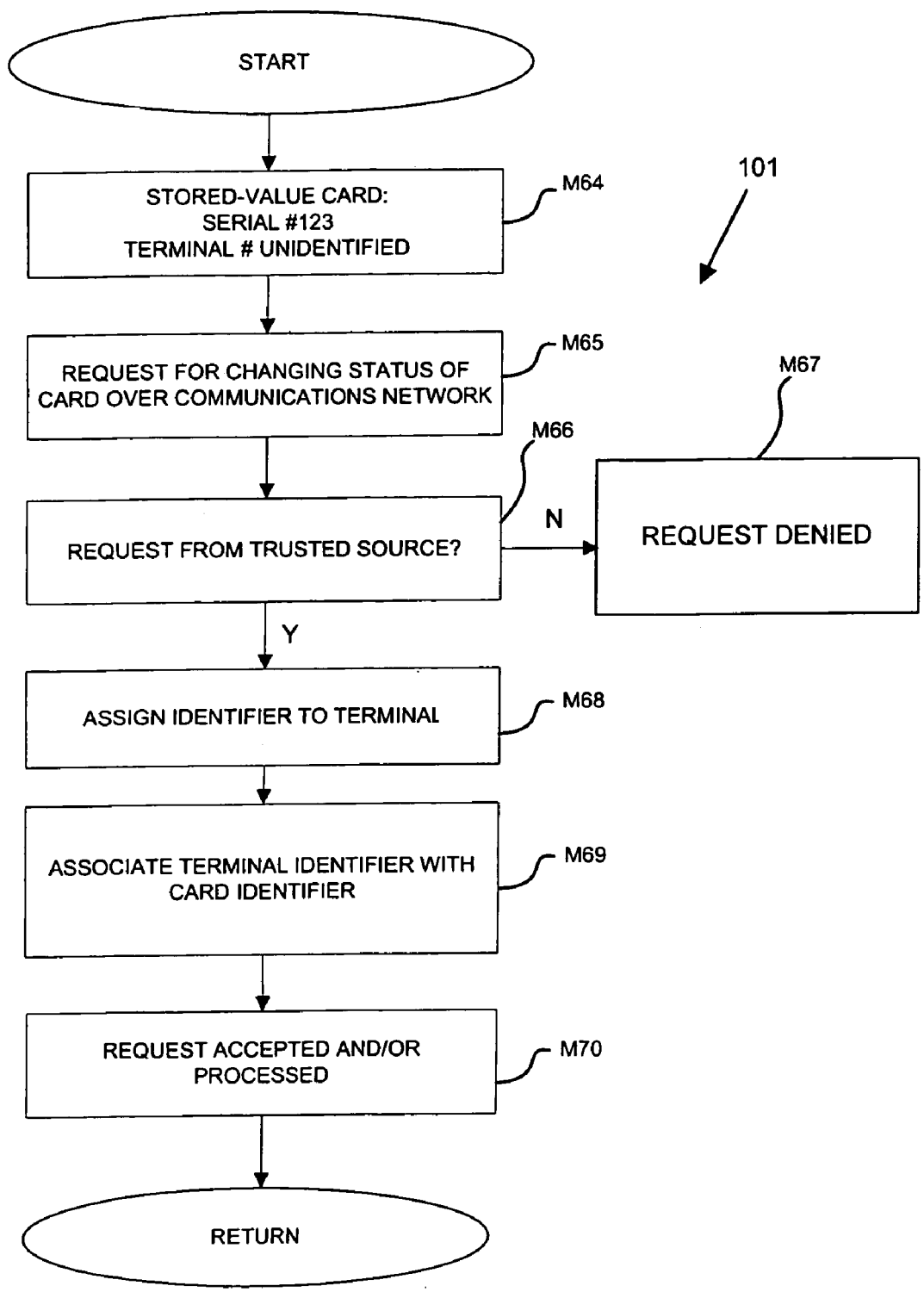
FIG. 16 is an exemplary flow chart illustrating another aspect of the present invention as may be implemented by the system of FIG. 13.

FIG. 16 illustrates an exemplary flow chart 101 such as may be implemented by a stored-value card data management system embodying one aspect of the present invention. As shown in steps M64 and M65 of FIG. 16, a terminal with no associated identifier makes a request for changing the status of a stored-value card with exemplary serial No. 123, which serial number has not been associated with any terminal. The request may then be processed as follows. In step M66, a verification and/or authorization module would allow for determining whether the request originated from a trusted source, such as a source identified in the central processor's database. The operation of the verification module depends on the type of communications network on which the request was made, as shown further in FIG. 17. If the request is not from a trusted source, then the request is denied or otherwise held or halted in step M67. Appropriate action may then be taken, such as attempting to identify or locate the requestor or merchant terminal, or invalidating the stored-value card with the identified serial number.

If the request is determined to be from a trusted source, then the request will continue to be processed. As shown in step M68, the unidentified merchant terminal may then be assigned an identifier, and the identifier may then be associated with the stored-value card identifier as in step M69. The request is then processed and/or accepted in step M70.

FIGS. 17A, 17B and 17C illustrate various exemplary communications networks, which can be used to verify that a request is made from a trusted source. In FIG. 17A, a merchant data channel interface M12A communicates with a central processing apparatus M17, which can be a central processor, host bank, or other centralized entity, via a dedicated data channel between a merchant and the central processing apparatus, such as dedicated telephone line M10A. Because the communications network is a dedicated data channel, only the merchant and the central processing apparatus have access to the communications network, in addition to those entities that may be granted access to the communications network by the merchant and central processing apparatus. Thus, the central processor authorizes all requests made over the dedicated data channel because such requests are deemed to be from a terminal affiliated with the trusted merchant who has access to the dedicated line. In this embodiment, the central processing apparatus determines that the request is from a trusted source if the request is received over a dedicated data source.

It may be appreciated that the central processing unit M16 can then add the requestor to the list of trusted sources by storing information identifying the trusted source in the database M18. This could be accomplished by assigning an identifier, such as a password or code, to the requester and storing said identifying information in the database M18 as a trusted source. Then, if the requestor later makes a request over a communications network that is not considered a trusted communications network, like a public switched telephone network, then the requestor can identify itself over the network while making a request. The central processor M16 can then determine that the requestor is a trusted source and accordingly grant the request. That requester may then be classified as a trusted source for subsequent transactions so that future requests will be automatically granted.

One way the processor can determine that future requests from a particular trusted requester are indeed from the trusted requestor is to assign identifying information to the requestor at the time the requestor is first determined to be a trusted source, such as when the requestor makes a request over a trusted communications network like a dedicated data line. In this embodiment, the processor M16 communicates the identifying information to the requester over the communications network M10 and also stores the information in its database M18. When the trusted source makes subsequent requests over any communications network, it includes the identifying information in its request to the processor M16. The processor receives the request with the accompanying identifying information. It can then compare the identifying information to the records stored in the database M18. By comparing the identifying information to the identifying information stored in the database M18, the processor can determine whether the merchant is a trusted source.

In one exemplary embodiment of FIG. 17A, ABC Stores, Inc. ("ABC"), a hypothetical trusted source, has a dedicated data line connecting one or more of its merchant terminals to a central processing apparatus. ABC opens a new ABC store with new merchant terminals that are as yet unknown to the central processing apparatus. In particular, the ABC store has been assigned no identifying information, and the database does not contain any information specifically identifying this particular ABC store. The unidentified terminal of the new store makes a request over the dedicated line. Although the central processing apparatus has never verified the identity of the new ABC terminals, the central processing apparatus will process and grant the request because it treats all requests made over ABC's dedicated line as a request made by a trusted source. In effect, any requestor on a dedicated line is automatically a trusted source. Other embodiments can be considered.

However, in another exemplary embodiment, the new ABC store terminal must first obtain an identifier before its request can be granted. Upon receiving the request and determining that the request was received over a dedicated line that is a trusted source, the central processing apparatus assigns an identifier to the requesting terminal and associates the identifier with the stored-value card's identifier. Then the request can be processed and the card can be activated. Other embodiments can be considered.

In another embodiment, the central processing apparatus sets up an identifier before the request. For instance, ABC notifies the central processor that a new ABC store is opening soon, and an identifier is reserved for that new ABC store in the event that a terminal at the new ABC store makes a request. Then when the requesting entity makes a request, the requesting identity is already identified. In this instance, the request could be processed without the step of assigning an identifier to the new terminal. However, additional identification could be added and/or assigned at the time of the first request as needed. For instance, the new store could be issued a default password, and then the new store could request and/or obtain a new password when it makes its first request to the central processor.

In FIG. 17B, an unidentified merchant with a unique phone number M12B communicates a request for a stored-value card to a central processing apparatus M17, such as a central processor M16, over a public switched phone line M10B. Such communication may use a modem, an interactive voice response system (IVR), or any other means of communicating over a public switched telephone network. The central processing apparatus can identify the unique phone number of the merchant based on the DNIS and ANI numbers that are carried on regular phone calls. Similarly, the "caller ID" feature can be used to identify the phone number of entities contacting a remote entity over a public switched phone line. The central processing apparatus can then determine if the identified phone number is a trusted source by comparing the merchant terminal's phone number with the phone numbers of the trusted sources stored in the database M18. If the central processing apparatus M17 determines that the phone number does belong to a trusted source, then the central processing apparatus M17 will process and grant the request. Otherwise, the request may be rejected.

Other methods of identifying merchant terminals can be considered.

In the embodiment of FIG. 17B, the merchant M12B communicates a request for a stored-value card to a central apparatus over a public switched phone line M10B. The merchant M12B enters a password or other identifying information over the phone line, such as by transmitting a series of tones during a phone call with a central processing apparatus M17. Other methods of communicating identification information over a phone line can be considered, such as by fax or internet communication. The central processing apparatus M17 then compares the identifying information of the merchant M12B with identifying information of the trusted sources listed in the database M18. Based on the comparison, the central processing apparatus determines whether the merchant M12B is a trusted source. If the central processing apparatus M17 determines that the merchant M12B is a trusted source, then the central processing apparatus M17 will process and grant the request. Otherwise, the request may be rejected. Other embodiments can be considered.

In FIG. 17C, a merchant computer terminal with a static IP (internet protocol) address submits a request by communicating with the central processing apparatus M17 via the internet M10C. Through methods well known in the art, a merchant computer terminal can connect to the internet through a modem, LAN, WAN, cable connection, or other internet connection. The merchant terminal is assigned a static IP address by its internet service provider, which could be a merchant, merchant group, or another service provider. The merchant terminal M12C communicates a request to the central processing apparatus M17. Through methods well known in the art, the central processing apparatus M17 determines the static IP address of the terminal M12C based on the received electronic communication. By comparing the static IP address with the static IP addresses of trusted sources, the central processing apparatus M17 can determine if the terminal M12C is a trusted source. If it is, then in a method similar to that described above for FIGS. 17A and 17B, the central processing apparatus M17 processes the request and activates the card. If it is not determined to be a trusted source, then the request may be rejected.

In one embodiment, the request is accompanied by information identifying the merchant computer terminal M12C. For instance, the merchant terminal M12C may enter a password, which is transmitted from the merchant computer M12C with a static IP address to the central processing apparatus M17. Through methods described above, the central processing apparatus M17 can then determine whether the merchant terminal M12C is a trusted source based on the password. If the merchant computer M12C is a trusted source, then the IP address may become a trusted source, such as by storing the IP address in the list of trusted sources in the database. However, because in some cases a given merchant computer M12C may have a different IP address the next time it logs onto the internet, the central processing apparatus M17 may purge such static IP addresses unless the merchant computer M12C is otherwise known to have a permanent static IP address.

In another embodiment, the central processing apparatus M17 does not store the IP address as a trusted source. In this embodiment, verification of the identification at the beginning of the request is sufficient to authorize the transaction, and no further authorization steps are necessary. Other embodiments can be considered.

In one embodiment, due to an arrangement with the merchant terminal's M12C internet service provider, the merchant has the same static IP address for every internet session. The central processing apparatus M17 stores this address in the database as an identifier for a trusted source. The merchant M12C makes a request over the internet from the same static IP address, and the central processing apparatus M17 processes and grants such request after it identifies the request as originating from a trusted static IP address, such as a trusted static IP address of a merchant terminal M12C.

In another embodiment, the merchant M12C will be assigned one of a set of static IP addresses, each of which are trusted sources. The merchant M12C can then make requests that will be processed, as described above, because it will always make such request using a static IP address that is a trusted source.

Figure 18:
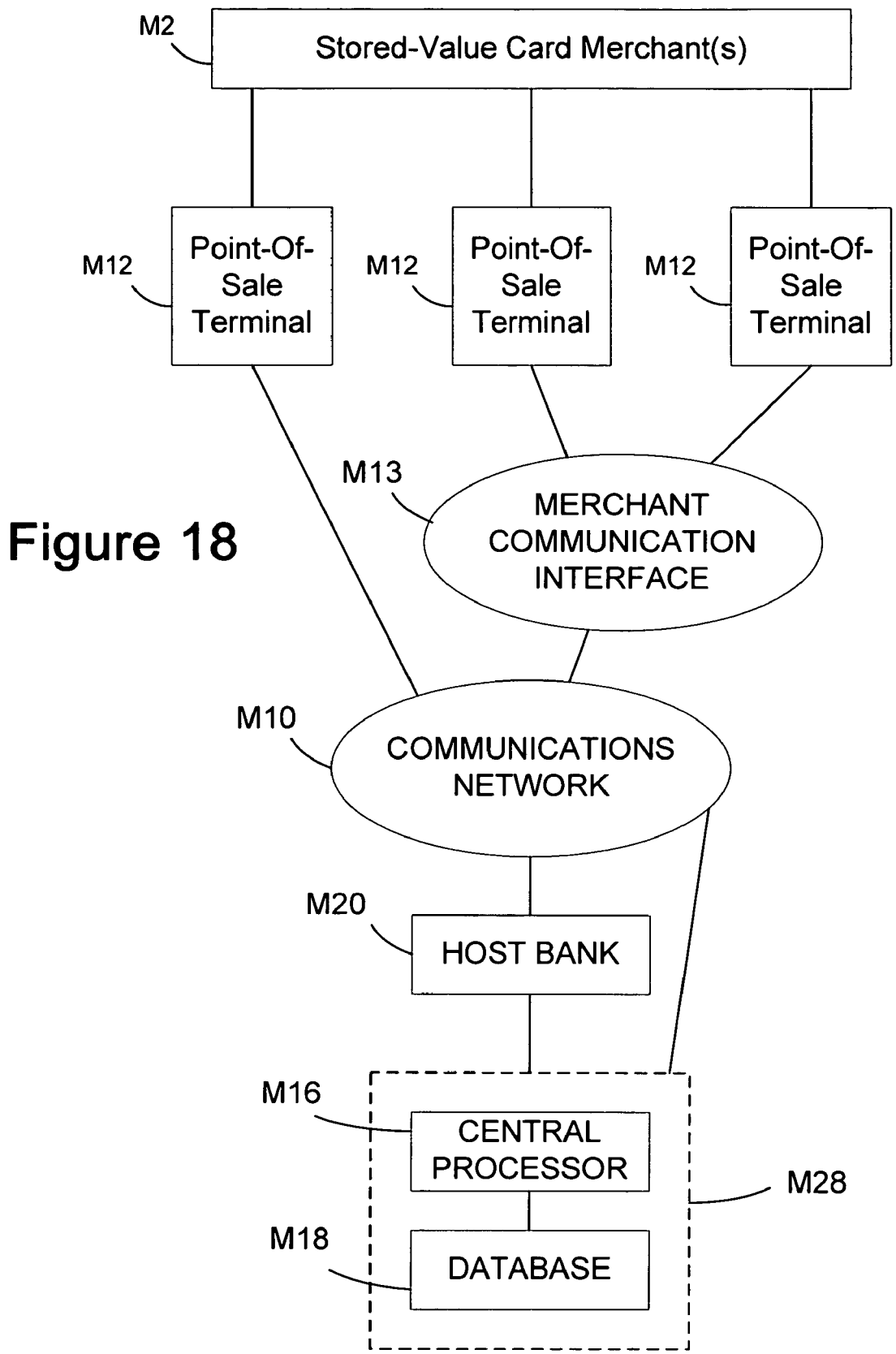
FIG. 18 is a block diagram illustrating an exemplary user tree and communication path of requests for stored-value cards between terminals and the central processor.

FIG. 18 shows an exemplary user tree and communication path between a merchant terminal M12 and the host bank and central processor M28. The system comprises one or more merchants M2, remote merchant point-of-sale terminals M12 each associated with one or more merchants M2, an optional merchant communication interface M13, a communications network M10, a host bank M20, and a central processor M28 comprising a processor M16 and a database M18 coupled to the processor M16. As illustrated in FIG. 18, point-of-sale terminals M12 can communicate with the host bank and central processor by interfacing first with a merchant communication interface M13. The merchant communication interface M13 can be connected to any number of point-of-sale terminals M12, which in turn can be connected to any number of merchants. The merchant communication interface M13 may itself be a point-of-sale terminal M12. For instance, the point-of-sale terminals M12 and the merchant communication interface M13 may be computers connected on a LAN (local area network) or a WAN (wide area network). Communications from multiple terminals M12 may first pass through a merchant communication interface/network hub M13 before the communications leave the merchant and pass through other communications networks M10 such as the internet, a dedicated line, or an outside phone system.

The remote terminals M12 can be any terminal as disclosed in this or the related applications. The remote terminals M12 may pass information to and from the communications network M10. The remote terminals M12 may connect to a merchant communication interface/network hub M13. The merchant communication interface M13 may comprise any transmitter, receiver, router, or other intermediate communication device. The merchant communication interface M13 may connect to a communication network M1. Alternately, the remote terminals M12 may directly connect to the communication network M10 and/or the central processor M28. The communications network M10 may pass information to and from a host bank M20. The host bank M20 and communications network M10 may pass information to and from the central processor M28.

Figure 17:
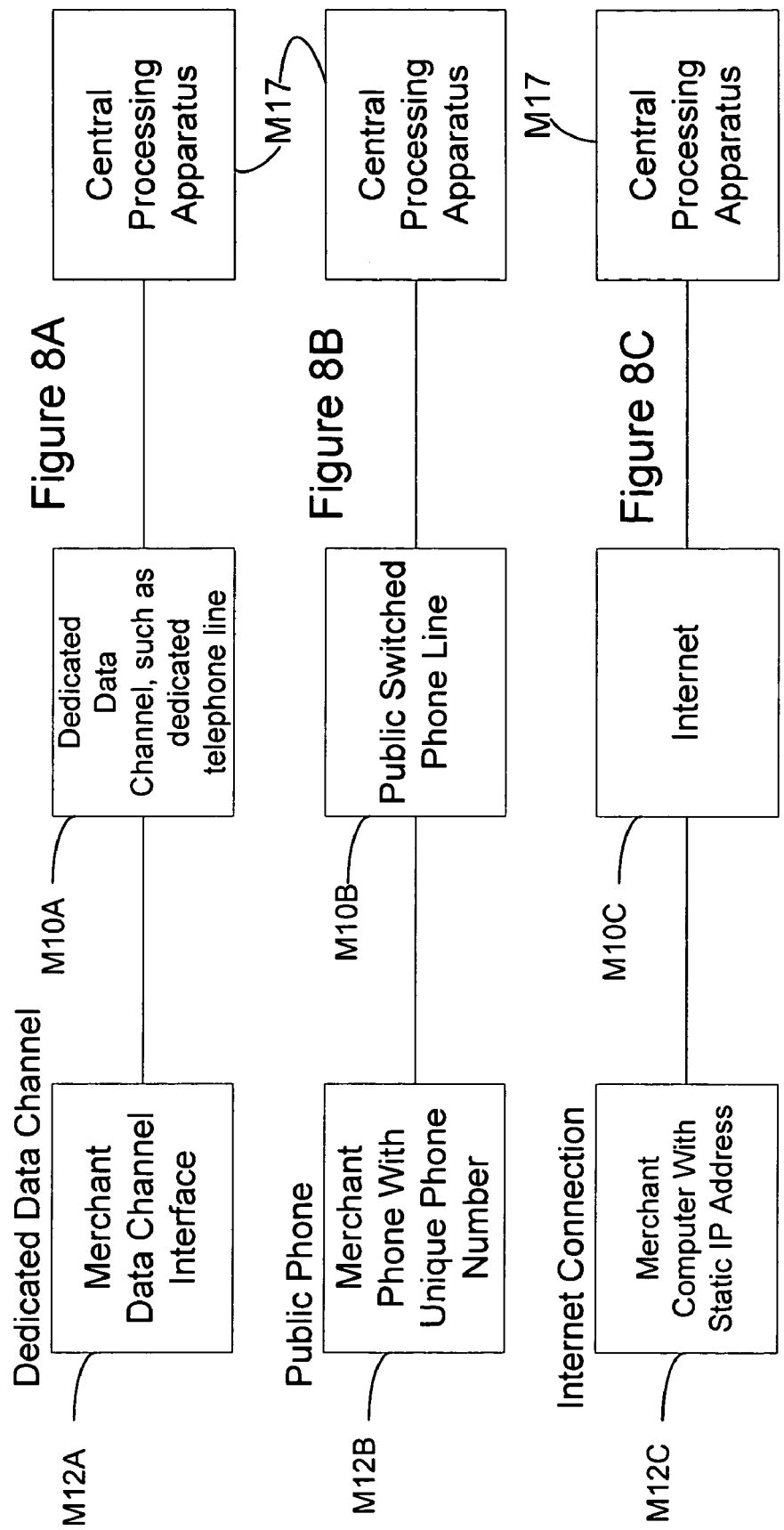
FIGS. 17A, 17B, and 17C are block diagrams illustrating different types of communications networks.

It must be noted that in the above FIGS. 16–18, the requesting terminal M12, M12A-C or other requesting entity may not have a prior identifier associated with it before the first request. Thus, to this extent, the requesting entity is not identified to the central processor and host bank. However, other information may already be known about the requesting entity. In the ABC example described for FIG. 17A above, the data management system 14M could already determine that the requestor was an ABC entity, such as an ABC store terminal, because only ABC entities have access to the dedicated line. It should be appreciated that the step of associating an identifier with a previously unidentified terminal can be removed entirely. It should also be appreciated that these methods apply equally to the request/activation process over phone lines and the internet.

Those skilled in the art may also appreciate that the service provider and/or card value can be chosen by the user upon purchase or activation, or at any time chosen by the user. When the requesting entity such as a merchant terminal requests a card or PIN, the requesting entity asks for a specific dollar, minute, or other value for the card. The central processor could then simply alter the existing record for the card, if one exists, in order to reflect a higher or lower dollar amount as requested by the user over the communications network. E.g., a customer could request that a given amount, such as $50, be assigned to a particular card. During the process of authenticating the transaction, the central processor could edit its records to reflect the new card value. Thus, card values can be variable. This is true whether the card values are initially fixed, or whether their value is unidentified and unassigned until the point of sale. Similarly, in the case of telecommunications service or any other kind of user services applicable to stored-value cards, the user may select the service provider at the point of sale, or later if the card must be redeemed by the user at a later date. At any point when the user interacts with the central processor, that processor has the ability to amend and alter the identifiers associated with a card as well as any other associated information, such as the card's current value or face value.

The stored-value card data management system in one exemplary embodiment enables a web-based, ID and password protected application available to anyone with internet access and the appropriate ID and Password. As described above, the system comprises respective modules for card generation, merchant establishment, location establishment, terminal setup, and inventory assignment to merchants and/or locations. The system may also be used for other card-related actions, such as web-based activation, deactivation, value change, refresh, and value redemption.

The present invention can be embodied in the form of computer-implemented processes and apparatus for practicing the processes described above. The present invention can also be embodied in the form of computer program code containing computer-readable instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose computer, the computer program code segments configure the computer to create specific logic circuits or processing modules.

Figure 19:
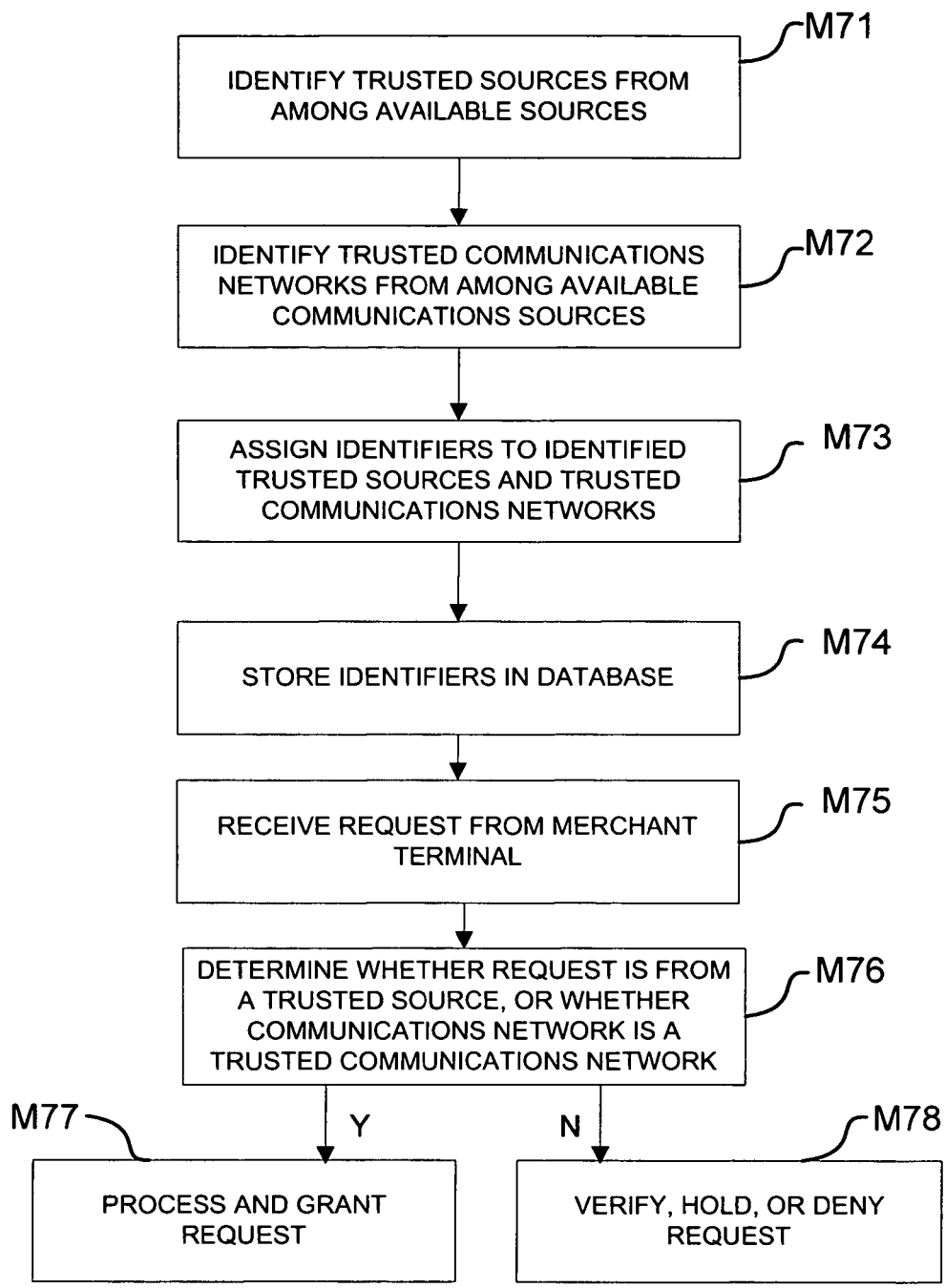
FIG. 19 is an exemplary flow chart illustrating another aspect of the present invention as may be implemented by the systems of FIGS. 10–12.

FIG. 19 is an exemplary flow chart illustrating another aspect of the present invention as may be implemented by the systems of FIGS. 10–12. In step M71, a person(s), processor, computer, or other entity identifies one or more trusted sources that are authorized to make stored-value card requests. The trusted sources may include, in a preferred embodiment, a list of merchants authorized to request PINs. Similarly, in step M72, an entity identifies one or more trusted communications networks that are known to carry or transmit only valid stored-value card requests. The trusted communications networks may include, in a preferred embodiment, a list identifying the various dedicated data lines connecting authorized merchants or merchant terminals to the central processor. Steps M71 and M72 are described separately, but it should be understood that these two steps need not be done in order. Further, the system should be constantly updating its list of trusted sources as new sources and networks are determined to be trusted sources.

In step M73, an entity such as the central processor M16 assigns identification information to the identified trusted sources and identified trusted communications networks. The identification information may be a merchant terminal ID number or other identifier, such as a static IP address or phone number. For communications networks, the identifier may be an internal code used to identify a particular communications network from another network. For instance, different communications networks that have different inputs into the processor system can be identified by assigning different numbers to the different inputs. In step M74, the identifiers are stored in a database M18. It should be noted that communications networks may not have identifiers in the traditional sense of the word, and such identifiers may not be amenable to storing in a database. For instance, trusted communications networks may be identified by virtue of having a different connection or input to the processor than communications networks that are not trusted, and thus they can be identified by virtue of having the separate connection.

In step M75, a request is received from a merchant terminal. Here, merchant terminal can mean any entity that submits a request to the processor. In step M76, the processor determines whether the request is from a trusted source, i.e., whether the requesting merchant terminal is a trusted source. The processor can make its determination based on information identifying the requestor. For instance, requestors can be verified to be trusted sources by correctly entering a password over a phone network. Phone requesters can also be verified by determining that the requestor's phone number is listed in the database as a trusted source. Requestors who request over the internet can be verified by having made the request from a trusted static IP address, or from a static IP address known to have previously submitted a correct password. The processor verifies the sources by comparing their identifier information such as passwords with the identification information stored in the database M18.

The processor also determines whether the communications network carrying the request is a trusted communications network. If the request carries an identifier that identifies the communications network, the processor can compare the identifier with the trusted identifiers in the database. This verification process can also be done by simply determining how the request arrived at the processor. For instance, if input #3 is a trusted source and the processor determines that the request arrived via input #3, then the processor can determine that the request was carried by a trusted source. Other methods can be used, which are well-known in the art.

If the request is determined to be from either a trusted source or a trusted communications network, then the request is processed and granted in step M77. If the request is not determined to be from a trusted source or trusted communications network, then in step M78 the request may be denied, other means of verification can be pursued, or the request can be put into a hold category.

Figure 20:
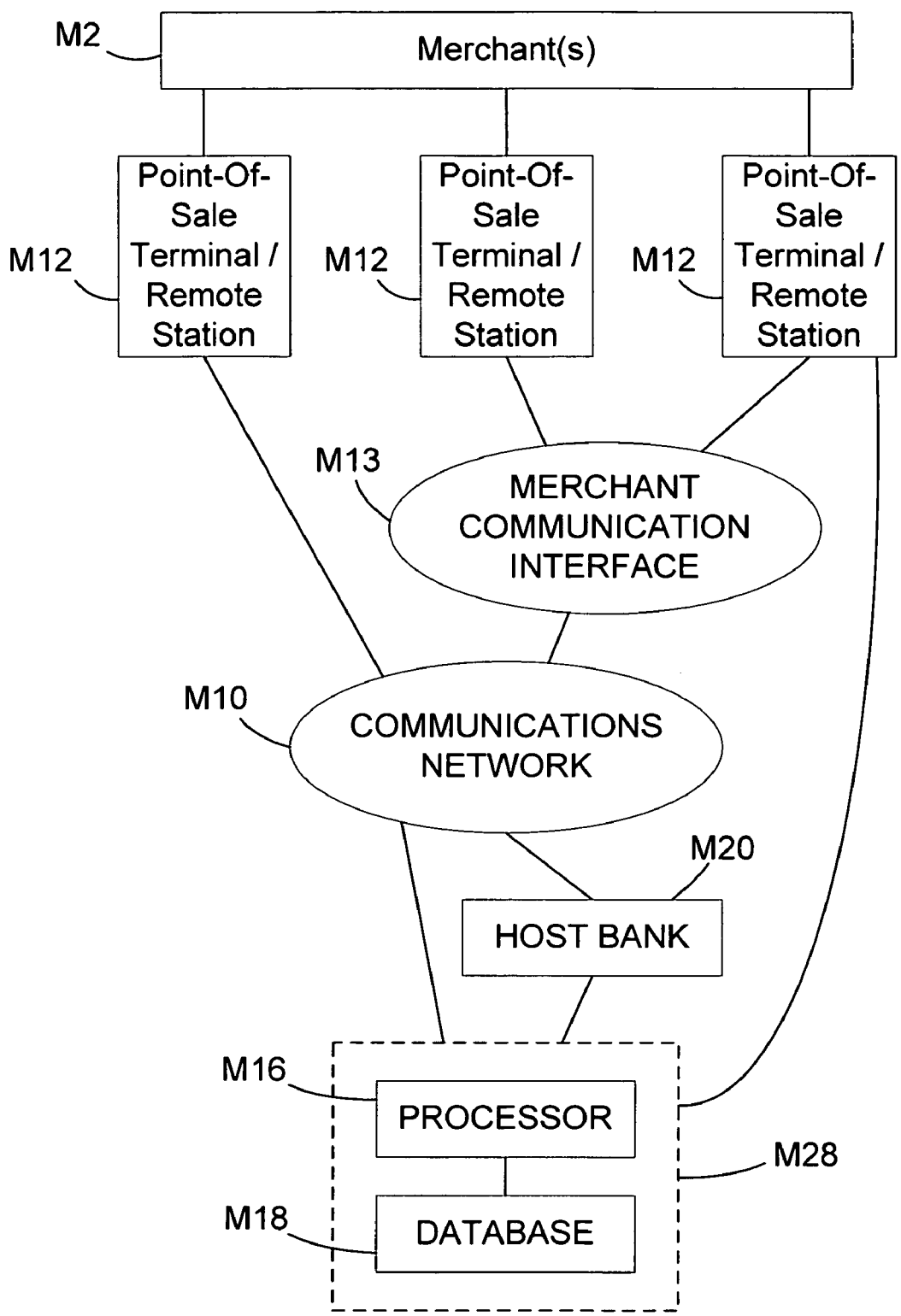
FIG. 20 illustrates a schematic block diagram showing how merchant terminals may be connected via a communication network to a central data management system embodying the present invention.

FIG. 20 illustrates a schematic block diagram showing how merchant terminals may be connected via a communication network to a central data management system embodying the present invention. The system comprises one or more merchants M2, remote merchant point-of-sale terminals M12 each associated with one or more merchants M2, an optional merchant communication interface M13, an optional communications network M10, an optional host bank M20, and a central processor M28 comprising a processor M16 and a database M18 coupled to the processor M16.

One or more stored-value card merchants may comprise one or more point-of-sale terminals M12. The remote terminals M12 can be any terminal as disclosed in this or the related applications. For instance, the remote terminals M12 may comprise an input device that reads credit card information. The terminal M12 may also comprise an ATM machine, or any other computer or terminal that can receive customer and/or merchant input information. The remote terminals M12 may be configured to process transactions. The transactions may occur over the communication network M1. Delivery and confirmation of the transaction may occur over the same or a different communication network M10. The remote terminals M12 may connect to a merchant communication interface M13. The merchant communication interface M13 may comprise any transmitter, receiver, router, or other intermediate communication device. The merchant communication interface M13 may connect to a communication network M10. Alternately, the remote terminals M12 may directly connect to the communication network M10 and/or the central processor M28.

The communication network M10 can comprise any communication network. Examples of communication networks M10 include dedicated telephone lines, public switched telephone networks (such as those that provide automatic number identification (ANI)), the internet (such as wherein the point-of-sale terminals have identifiable IP addresses), any other computer network such as a WAN or LAN, and any other networked communication. The communication network M10 may be connected to a host bank M20, or alternately it can connect directly with the central processor M28.

The transactions may involve the purchase of stored-value cards, PINs, or any other product or service, preferably products and services associated with a PIN or other code that can be delivered electronically from the central processor M28 to the merchant terminal M12. The transactions may include the sale of a PIN and/or the sale of a prepaid service that may be accommodated by a stored-value card, such as long distance telephone communication, wireless communication, paging and internet-enabled communication services, including wireless web access. Other examples of prepaid services and/or products that may be accommodated by the transaction include gift cards, prepaid gas cards, prepaid grocery cards, prepaid entertainment cards, downloadable ring tone cards, downloadable game cards, downloadable music cards that use MP3, MP4, WMV, WAV, or other music formats, any other downloadable software card, customer rewards cards, and any other type of stored-value cards for products, services, or both, that may be prepaid by the owner of the card.

Prepaid long distance phone cards, a type of stored-value card, are generally used in the telephone industry to allow customers to pre-purchase long distance calling time. Each of the cards has a printed identification number. Identification information associated with the card can be magnetically stored therein or printed on a barcode. The identification number is also stored in a file in a database maintained by the card issuer, such as database M18. In the traditional business model, when the cards are sent to the retail location from which they will be sold, the corresponding records in the database are activated, thus allowing the card to be used immediately by a customer. To use the card as a prepaid long distance card, the customer dials a toll free number to access the card issuer's system, enters the identification number, and then makes the desired long-distance call.

The system of FIG. 20 (and also FIG. 21) may be used to confirm transactions as follows, and also as described with respect to FIGS. 21 & 22. The system is configured to confirm any number of successive transactions through an iterative process.

The central processor M28 may store information relating to a first transaction at the database M18, which may pass information to and from a processor M16. The central processor M28 may transmit and receive information via an input/output Z23 coupled to the processor M16 and database M18. The merchant terminal may also be configured to store transaction information, such as identification information for past transactions, which may comprise transaction numbers or PINs.

The first transaction may correspond to the most recent transaction wherein the central processor M28 transmitted a transaction identifier to the particular remote station M12, e.g., a PIN to be distributed to an end user. During the course of the first transaction, the central processor M28 transmits the PIN or other product or code to a remote terminal M12. At this point, the central processor M28 has not yet verified with the remote terminal M12 whether the remote terminal M12 actually delivered the PIN to an end user.

The verification process begins when the remote terminal M12 transmits to the central processor M28 a request for a new transaction identifier. The transmission may be directly to the central processor M28 or via the merchant communication interface M13 and/or the communication network M10. Such request may also be routed through the host bank M20 affiliated with the central processor M28 or remote terminals M12. The remote terminal M12 transmits with the request the transaction identifier for the last successful transaction successfully completed at the remote terminal M12. A record of the last successful transaction (and/or any number of prior transactions) may be stored at a database coupled to the terminal M12.

When there are no errors or equipment failures, the central processor M28 should receive from the remote station M12 a transaction identifier that matches the central processor's first transaction. In such a case, the central processor M28 can verify that the merchant associated with the remote terminal should be billed a certain amount according to the transaction. Such verification might occur, for example, by checking that the record of the first transaction stored at the database M18 matches the identifier received from the remote station M12. The verification may occur in response to the central processor M28 receiving the identifier. It may occur immediately, or it may occur at another time before the end of a billing cycle or other event, such as a subsequent transaction request. In a preferred embodiment, verification occurs during the present transaction.

While the remote station's M12 last successful transaction ought to correspond to the processor's M16 last successfully transmitted transaction identifier (i.e., the first transaction identifier), errors may cause discrepancies. When the last successful transaction of the remote station M12 does not match the last successful transaction of the processor M16 (e.g., the last transaction for which an entry was recorded in the database M18), then the central processor M28 alters the stored record of the first transaction to indicate that it is a questionable transaction, i.e., that the transaction was not necessarily completed successfully and there may have been an error. In other words, the processor M16 recognizes that the remote station may have failed to complete the last transaction. A variety of errors in the system may cause such a discrepancy. On the other hand, although the transaction is determined to be questionable, it is possible that the transaction was nevertheless completed successfully. Some investigation may be required to reconcile the true status of the transaction and/or the cause of the error or discrepancy. In a preferred embodiment, altering the stored record occurs prior to a subsequent transaction and in response to receiving the identifier and determining whether the transactions match.

At this point, the transaction is determined by the processor M16 to be questionable, and active steps can be taken to determine whether the transaction was completed. For instance, the central processor M28 (or a party associated with the central processor M28, such as a financial institution or company) may contact the merchant terminal M12 (or a party associated with the merchant terminal M12, such as a merchant M2 or merchant employee) to request confirmation that the questionable transaction was successful. Some merchants M2 and/or terminals M12 may store electronic or hard-copy records of all successful (and unsuccessful) transactions, thereby facilitating the confirmation process. For instance, the central processor M28 may electronically request that a merchant terminal computer M12 transmit back to the central processor M28 a list of the most recent successful transaction identifier(s). Information passed between the merchant terminal M12 and the central processor M28 may include any information regarding prior transactions, such as records of failed transactions or corrupted PINs or other products or identifiers.

The status of a questionable transaction may also be confirmed by the actions of third parties. For instance, if the transaction was the distribution of a PIN to an end user, then the activation of the PIN by the end user can signal to the processor M16 that the transaction must have been consummated. After such supplemental transaction confirmation, the merchant M2 or other appropriate party could be billed even though the PIN was the subject of a questionable transaction.

Under this method, several transactions might be deemed to be questionable at any given time. For instance, if the central processor M28 delivers PINs with transactions #1–5 to a remote terminal M12, but the remote terminal M12 sends confirmations for only transactions #1 and #5, then the central processor M28 will "flag" transactions #2–4 as being questionable. For example, if the last verified transaction before transaction #5 was transaction #1, then transactions #2–4 will be immediately marked as questionable since they have not been verified.

To prevent the unauthorized distribution of PINs, the system may have security protocols for determining whether to process a request from a merchant terminal M12. The communication network M10 may be a known and/or trusted carrier of PIN requests, such as a dedicated data line, wherein the central processor M28 recognizes that a request for a PIN received via the trusted communication network M10 must be from a merchant terminal authorized to make PIN requests. Alternately, the merchant terminals M12 themselves may be trusted sources. For instance, trusted sources of requests may comprise merchant terminals M12 on a dedicated data line, merchant terminals M12 at a particular or identified phone number on a public switched telephone network, and merchant terminals M12 at a particular or identified internet IP address. The central processor may store records identifying the trusted sources and/or trusted communication networks, and it may process any request that is identified to be from a trusted source (or via a trusted communication network M10). A source may be identified by its phone number or internet IP address, for example. The merchant terminal may also become a trusted source by transmitting a proper PIN or password to the central processor.

Figure 21:
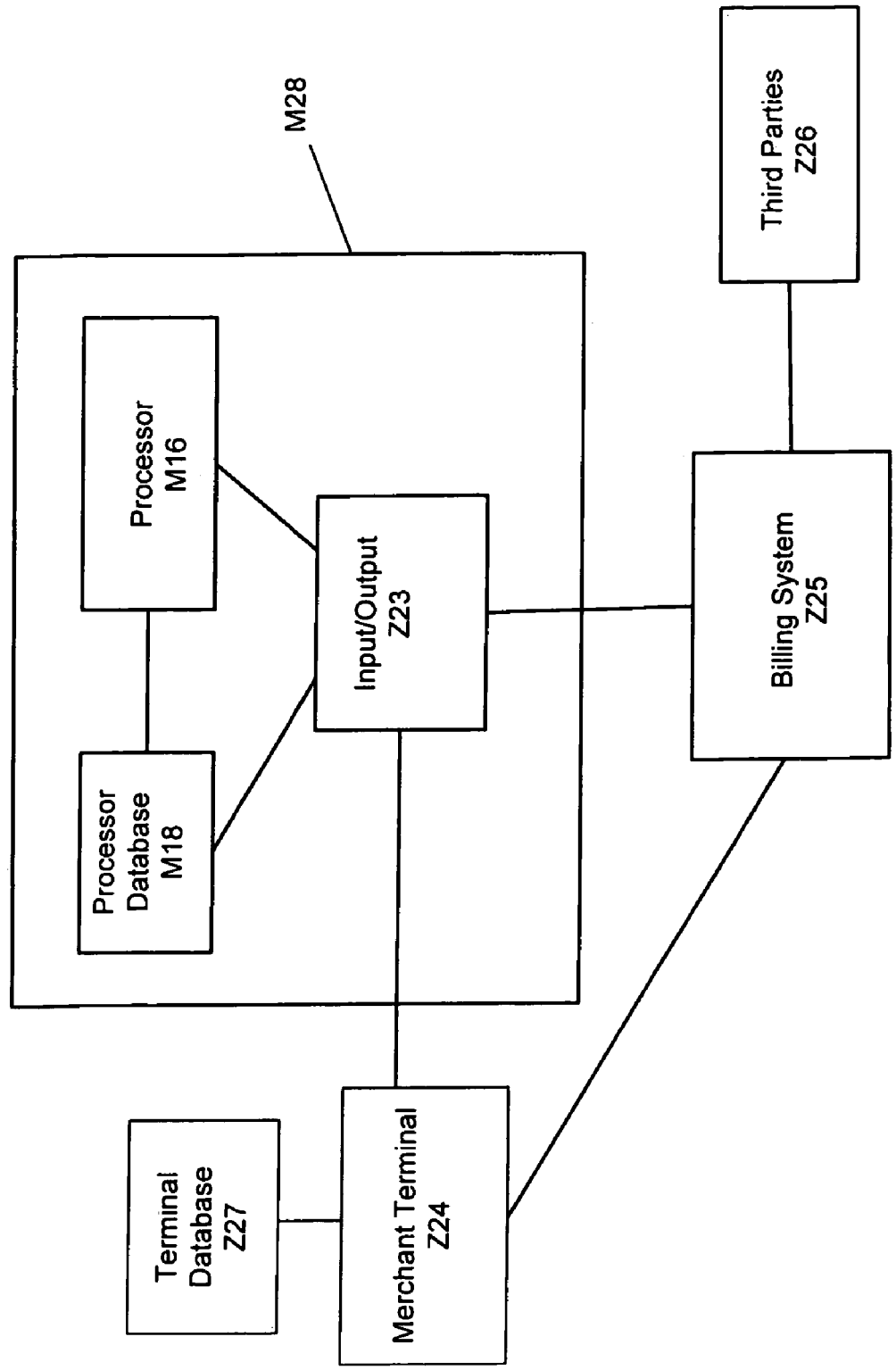
FIG. 21 illustrates a schematic block diagram showing how the processor, input/output device, and database may be interconnected with a merchant terminal in accordance with the present invention.

FIG. 21 illustrates a schematic block diagram showing how the processor, input/output device, and database may be interconnected with a merchant terminal in accordance with the present invention. An input/output device Z23 is operatively connected to a database/memory M18, a processor M16, a merchant terminal M12, and a billing system Z25. The input/output device transmits and receives transaction identifier information. The database M18 stores transaction-related information, such as transaction identifier information. The processor M16 communicates with the merchant terminal M12 and the billing system Z25 via the input/output device Z23.

The system of FIG. 21 comprises a central processor M28, a billing system Z25, third parties Z26, a merchant terminal M12, and a terminal database Z27 coupled to the terminal M12. (Alternately, the terminal M12 may comprise its own database.) The central processor M28 comprises a processor M16, a processor database M18 coupled to the processor M16, and an input/output device 23 coupled to the database M18 and processor M16. The database M18 may store information regarding transactions, including transactions that have not yet been confirmed. As described herein, the system is configured to process and confirm transactions.

In the transactions contemplated herein, a customer may request or purchase any type of product or service, such as those associated with a PIN. For instance, the customer may request a stored value card, such as a phone card, wherein the delivered PIN activates or enables the card. The customer may customize the request by selecting a stored-value amount, such as $20 or $50, and selecting a carrier or brand, such as AT&T or MCI. Other selections can be made. The requested PIN may also correspond to downloadable content, such as software. For instance, the customer may request a specific software product, such as a downloadable ring tone or music files, and the delivered PIN may be used to enable the download any time after PIN delivery.

The merchant terminal M12 transmits a transaction request to the central processor M28 via the input/output device 23, which passes it to the processor M16. Included with the transaction request is an identifier corresponding to the remote terminal's M12 last acknowledged transaction, which may be stored in the terminal database Z27 and passed from the database Z27 to the terminal M12. The processor M16 compares that information with transaction information stored at the processor database M18 pertaining to the last PIN (or other identifier, product, or service)

delivered to the particular remote station M12. If the two transactions match, then the billing records are reconciled and the central processor M28 may cause the appropriate parties to be billed, such as by transmitting billing information to the billing system Z25. The billing system Z25 can bill the merchant associated with the merchant terminal M12.

If the two transactions do not match, then at least one of the records stored at the database M18 will be immediately flagged as "questionable", and more active steps can be taken by the processor M16 and/or the billing system Z25 to ascertain whether such questionable transactions can be billed. For instance, the billing system Z25 can communicate directly with the merchant terminal M12 as well as third parties Z26 to ascertain whether the PIN or other product was actually delivered to either the merchant terminal M12 or end user. For instance, the billing system Z25 might contact third parties Z26 such as the billing office of the phone company that handles the activation of the PINs (or other products or services) that are the subject of the questionable transactions. For instance, if the product is a phone card activated through a delivered PIN, the billing system Z25 may communicate with a third party telecommunications carrier Z26 to determine whether the questionable PIN has been activated.

Figure 22:
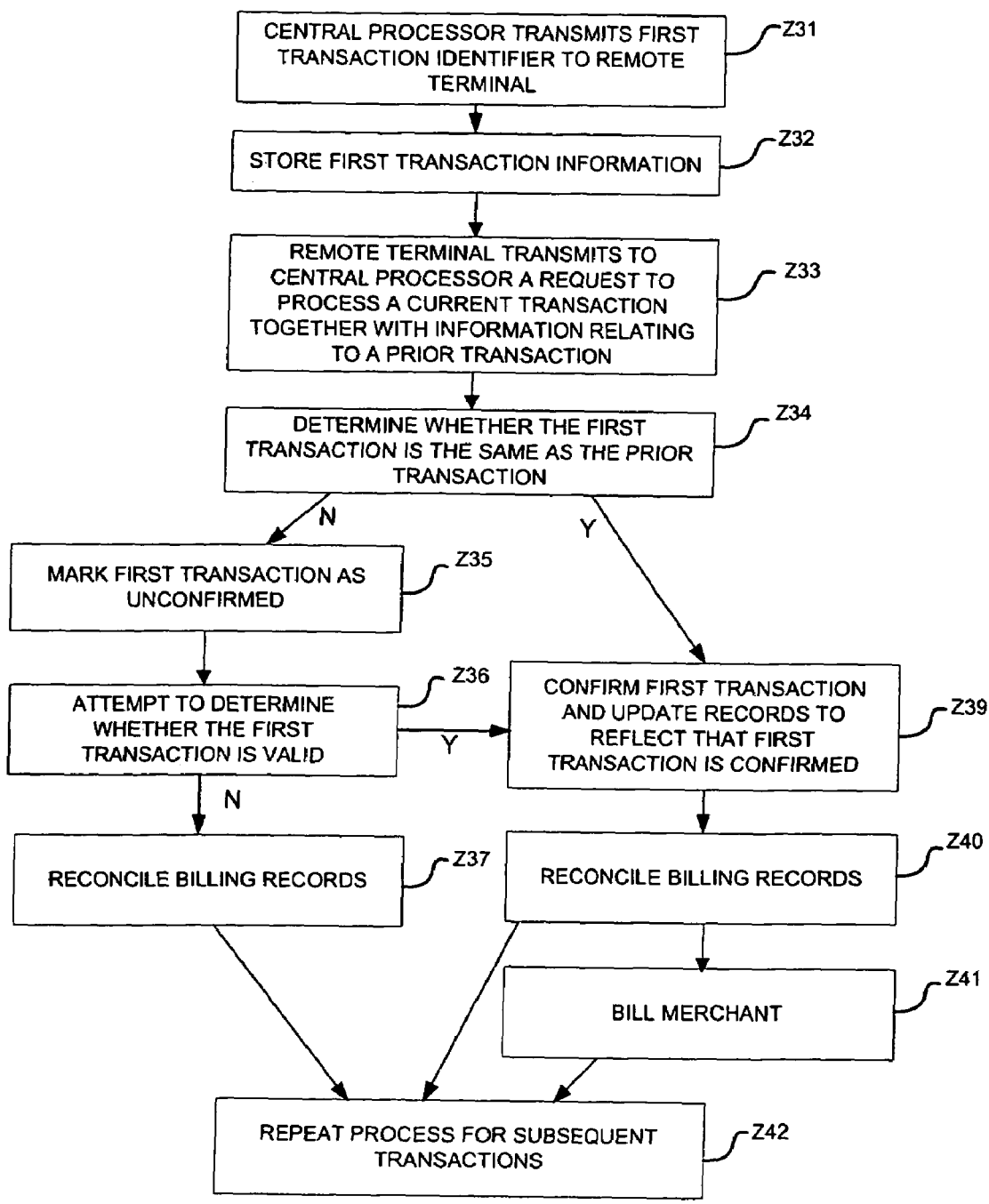
FIG. 22 is an exemplary flow chart illustrating one aspect of the present invention as may be implemented by the system of FIGS. 20 & 21.

FIG. 22 is an exemplary flow chart illustrating one aspect of the present invention as may be implemented by the system of FIGS. 20 & 21. Through the process of FIG. 22, a central processor confirms whether a transaction was completed at a remote terminal by verifying whether a prior transaction identifier received from a remote terminal in a subsequent transaction request corresponds to a prior transaction identifier stored at the central processor. For purposes of explanation, the transaction identifier received from the merchant may correspond to Transaction A, and the most recent transaction identifier stored at the central processor may correspond to Transaction B. If there are no errors, the identifier received from the merchant should correspond to the most recent stored identifier, and Transaction A should be the same as Transaction B. This process can repeat any number of times for confirming successive transactions. Each subsequent transaction request may include a prior transaction identifier for confirming a prior transaction.

In step Z31 of FIG. 22, the central processor transmits to a remote terminal a first transaction identifier. For purposes of demonstration, the first transaction identifier may correspond to Transaction A. The first transaction identifier, for example "A1," may be transmitted by the central processor along with a corresponding first transaction PIN (or other product or service) in response to a request for a PIN from the remote terminal. The request may be initially made by a customer at the remote terminal during a first transaction. The identifier is transmitted together with the PIN for purposes of later identifying the first transaction and confirming that it was successfully completed, as described below.

A transaction identifier may comprise a PIN or any other identification number or code. A PIN could be a password or other number or code. For instance, a customer may request a PIN (or product associated with a PIN) from a merchant. The merchant may then request a PIN from the central processor through the remote terminal. The central processor may then transmit the PIN and a transaction identifier (such as "A1") identifying the PIN transaction, according to step Z31. The first transaction identifier may be any form of identification, such as a unique number associated with the transaction or the PIN itself. At this point in the process, the central processor has no information regarding whether the remote terminal has successfully received the first transaction identifier (or the PIN), nor does it know whether the PIN was delivered to a customer.

In step Z32, the first transaction identifier (such as "A1") is stored. It may be stored at any storage location, such as a database at the merchant terminal. The PIN may also be stored. The database may store the identifier (and PIN, optionally) for each of the terminal's transactions. Storing such information may be useful for later reconciling records between the terminal and the central processor. The storage location may have a limited memory such that only a certain number of identifiers can be stored before each new identifier causes a prior identifier to be erased. In one embodiment, first transaction information other than the first transaction identifier is stored. For instance, a portion of the identifier may be stored, or the PIN may be stored instead of the identifier. Regardless, the stored information is specifically associated with the first transaction and can be used to specifically identify the first transaction. For instance, the information may comprise date and time information regarding the time that a request was made.

In step Z33, the remote terminal transmits to the central processor a request to process a current transaction (Transaction C) together with information relating to the most recent prior transaction that was successfully received at (and/or delivered to a customer by) the remote terminal (Transaction B). The prior transaction information is transmitted to the central processor in order to confirm that the prior transaction was successfully completed at the remote terminal. Absent errors, the merchant terminal's most recent successful transaction (Transaction B) should also be the most recent transaction for which an identifier was recorded at the central processor (Transaction A). The prior transaction information is also preferably stored at the merchant terminal or a database connected to it. The central processor should receive the transmitted information.

In a preferred embodiment, the transmitted information relating to a prior transaction is the prior transaction identifier (such as an identifier originally received from the central processor), such as "B1," but it could be any information specifically associated with a prior transaction that can be used to specifically identify the prior transaction.

This step contemplates the possibility that the remote terminal never received the first transaction identifier (or the first PIN), or that some other communication or transaction error may have occurred. When an error occurs that prevents the remote terminal from successfully receiving the first transaction identifier (or otherwise completing the transaction), then the identifier would not be stored. If this is the case, then the remote terminal's prior transaction identifier may correspond to a transaction prior to the first transaction, and Transaction A may not be identical to Transaction B; similarly, their identifiers may not be the same.

In step Z34, the processor determines whether the first transaction (Transaction B) is the same as the prior transaction (Transaction A). As described above, the processor uses the database to verify that the remote station's latest recorded transaction is the same as the processor's latest recorded transaction. In a preferred embodiment, this step may comprise comparing a first transaction identifier (A1) with a prior transaction identifier (B1) to determine whether they are the same. This step Z34 may occur immediately after receiving the information from the remote terminal, or it may occur before the end of a billing cycle or other event, such as the next transaction request from the remote terminal. In a preferred embodiment, the determining step Z34 occurs in response to receiving the identifier from the remote terminal.

If they are the same (A1 equals B1), then in step Z39 the first transaction is confirmed and records are updated to reflect that the first transaction is confirmed. Confirming a transaction may comprise amending stored transaction information (such as the stored transaction identifier or record) to reflect that the transaction has been confirmed. It may also comprise sending transaction information to another party or database reflecting that the transaction is confirmed. This step Z35 may occur immediately after receiving the information from the remote terminal, or it may occur before the end of a billing cycle or other event, such as the next transaction request from the remote terminal. In a preferred embodiment, the confirming and updating step Z39 occurs in response to receiving the identifier from the remote terminal and/or in response to the determining step Z34.

The billing records are reconciled in step Z40. Reconciling billing records may comprise comparing the billing or transaction records of one database with transaction information (such as identifiers) of another. Billing records may be stored at the central processor and/or another database. In a preferred embodiment, the billing records are separate from a list of confirmed transactions stored at the central processor, and this step comprises comparing and/or amending the two data sets. In another embodiment, the billing records are identical to the records updated in step Z39. In this embodiment, step Z39 also completes step Z40. This step Z40 may occur immediately after receiving the information from the remote terminal, or it may occur before the end of a billing cycle or other event, such as the next transaction request from the remote terminal. In a preferred embodiment, the confirming and updating step Z35 occurs in response to receiving the identifier from the remote terminal and/or in response to the confirming and updating step Z39.

If the transaction was confirmed, then the appropriate party is billed in step Z41. The appropriate party may be the merchant who received and/or distributed the PIN or other product or service. The appropriate party may also be a customer, such as a customer who activates the PIN through the central processor or a third party. The billing step Z41 may be any billing method used by merchants, banks, and/or PIN distributors, such as invoicing a merchant or charging a customer's credit card. The billing may not occur immediately after the transaction, but instead may occur at the end of a month or other billing cycle. The billing may also occur before the billing records are reconciled.

On the other hand, if the central processor receives a transaction identifier that is not identical to the prior transaction identifier (i.e., A1 does not equal B1), then the processor will immediately mark any unconfirmed transactions as questionable in step Z35. Unconfirmed transactions may include transactions through a particular remote terminal that have not yet been confirmed by that terminal (other than the current transaction, which would not be confirmed until a subsequent transaction request).

The step of marking a transaction as questionable Z35 may occur in a variety of ways. For instance, the step Z35 may comprise amending its identifier (or record or entry) stored in the database, deleting its identifier, moving the identifier from one database to another, communicating information about the questionable transaction to a central billing system or another entity (such as via email), sending the PIN(s) correlated to any questionable transaction to a database, deleting the questionable PINs, or any other method of distinguishing the questionable entries from the confirmed (and current) entries, by any act or omission.

In one embodiment, transaction records are "marked" only when they are confirmed. Since questionable transactions have not been marked confirmed, they can still be identified because they are the only processed transactions that have not been confirmed. In this sense, the question After step Z35, an attempt may be made to determine whether the questionable transaction(s) is valid in step Z36. As mentioned above, a merchant or third party related to the billing function or otherwise related to the specific questionable transaction(s) can be contacted to determine if any further information exists about whether a given transaction was completed. If the transaction is ultimately confirmed, then the flow chart proceeds to steps Z39–41.

If a transaction is not confirmed, then other action may eventually be taken. For instance, the transaction or PIN may eventually be cancelled or invalidated, and no party will be billed. Alternately, the transaction or PIN may be marked as "questionable" for an indeterminate amount of time. The billing records are reconciled in step Z37 to reflect that the transaction has been identified as questionable. In one embodiment, this step may comprise comparing or communicating the records (or a portion of the records) of a database in the central processor with a database at a financial institution or another company responsible for billing inquiries or other financial matters. Alternately, other apparatus at the central processor may be responsible for billing, or the central processor itself may keep the billing records, and the central processor can handle the billing reconciliation.

After the process has proceeded through the flow chart of FIG. 22 through any of the scenarios described above, the process can repeat for any number of successive transactions in step Z42. These successive transactions may correspond to subsequent requests for PINs and deliveries of the PINs to the remote terminal. The whole process of FIG. 22 would begin again, for instance, when the central processor delivers to the remote terminal a transaction identifier (and PIN) for the current transaction, which was requested by the terminal in step Z33. The process of delivering the identifier and PIN would proceed in the manner described above for step Z31. Basically, the process would follow the entire process shown in FIG. 22, starting from the beginning, except that the labels of the transactions ("current," "first," "prior") would change. For example, the "current" transaction of step Z33 would become the "first" transaction for the next iteration of the process of FIG. 22.

The following example is provided to further illustrate the process of FIG. 22. The central processor delivers PINs to Remote Terminal #ABC in transactions associated with transaction identifiers ID1, ID2, ID3, and ID4. The transaction corresponding to identifier ID11 proceeds without error according to the process described above for FIG. 22, and this transaction becomes the most recent successful transaction for both the central processor and Terminal #ABC. Identifier ID1 is stored at both the central processor database and Terminal #ABC's database. In the next transaction, which corresponds to ID2, Terminal #ABC submits a request for a PIN associated with identifier ID2 and accordingly submits the identifier of its last recorded transaction, ID1. The central processor properly confirms the transaction corresponding to ID1, which is the most recent transaction for which a PIN and identifier was successfully delivered from the central processor to Terminal #ABC. The central processor transmits the identifier ID2 as well as its associated PIN, and it stores a record of ID2. Terminal #ABC fails to receive identifier ID2 due to a communication error, and it requests another PIN in a transaction associated with identifier ID3. It submits with this request the identifier corresponding to its last recorded transaction (which is ID1 rather than ID2 because ID2 was never received). The central processor compares the submitted identifier, ID1, with the central processor's last recorded identifier, ID2. It determines that they are not the same, and thus the central processor marks the transaction associated with ID2 as questionable. The central processor transmits identifier ID3 and its associated PIN to Terminal #ABC, and it stores a record of ID3. Terminal #ABC receives ID3 but not its associated PIN, due to an error. Terminal #ABC then requests a PIN in a transaction corresponding to ID4. It accordingly submits identifier ID1 with the request, since it is the identifier corresponding to the last transaction where a PIN was successfully received at Terminal #ABC. The central processor compares submitted ID1 to recorded ID3, determines that they are not identical, and therefore marks ID3 as questionable (and also possibly ID2). The central processor transmits ID4 and its associated PIN to Terminal #ABC, and it stores a record of ID4. Terminal #ABC successfully receives the transmission. Terminal #ABC requests a PIN in a transaction corresponding to ID5 and accordingly submits identifier ID4, its last recorded identifier. The central processor determines that its most recent transaction matches with Terminal ABC's most recent transaction, and the transaction associated with ID4 is confirmed.

As described above, this iterative process contemplates the possibility that the terminal never receives the PIN requested in step Z33, i.e., the "current transaction" PIN. In such a case, during the first subsequent transaction of step Z42 the "prior transaction identifier" that is transmitted by the remote terminal with the PIN request will not match the central processor's records of the most recent transaction (namely, the "current transaction" of step Z33). The "current transaction" would then be marked as a questionable transaction as described in step Z35.

A successive transaction Z42 may occur before billing records are updated in step Z40 and before a party is billed in step Z41. Transactions may occur multiple times in one day at a merchant terminal, while billing may be once a month for all the confirmed transactions occurring during that month.

Other embodiments can be considered. For instance, for many of the embodiments described above, the request can be any request, including a request for activation, deactivation, value change, or another request.

It will be understood that the specific embodiment of the invention shown and described herein is exemplary only. Numerous variations, changes, substitutions and equivalents will now occur to those skilled in the art without departing from the spirit and scope of the present invention. Accordingly, it is intended that all subject matter described herein and shown in the accompanying drawings be regarded as illustrative only and not in a limiting sense and that the scope of the invention be solely determined by the appended claims.

For instance, stored-value cards as described in this application may be used in many different industries and for many different products and services. The stored value cards may be used for purchasing any product or service, such as prepaid products and services. For instance, a customer may purchase a stored-value card to obtain: emergency road service, legal service, accounting service, tax service, property cleaning and/or maintenance service, clothe cleaning service, transportation service, travel service, delivery service, online (or off-line) dating service, electrical and/or gas service, water service, sewage service, internet access, and film processing (including digital film processing). Stored-value cards may also be used for prepaid movie service, downloadable movie cards, and bridge and/or road toll service. The services may be obtained by purchasing an associated stored-value card from a merchant, as described herein.

In each of these different stored-value card embodiments, the service provider may be different from a telecommunications provider, which is the exemplary embodiment used throughout the application. It will be appreciated by one skilled in the art that the system and methods described herein with respect to telecommunication providers may also be used for other service providers, such as providers of prepaid movie tickets. Instead of having an account with a telecommunications provider, customers may have an account (such as a stored-value account) with the provider of the other services described herein. For instance, a customer may have an account with a national automobile service provider in the case of prepaid emergency road service.

Alternately, the customer may have a single account managed by one centralized company or provider that pools together a variety of different service providers. For instance, the customer may hold an account with a major credit card network affiliated with a variety of credit card partners, wherein one or more partners are product and/or service providers from which a customer may redeem stored-value card value. In this way, a customer may accumulate product or service value in an account and later choose a specific service provider and service. For instance, a customer who has accumulated $50 in such a "general" stored value account may elect to redeem $10 of prepaid movie service (such as by obtaining a ticket to see a movie), $20 of prepaid emergency road service (such as mechanic, gas, or towing service), and $20 of city bus service. These may be elected at one time or different times from the central provider. In this scenario, the central/general account provider (such as a bank with partner service-providers) would likely have agreements with a plurality of product and/or service providers who may provide products and/or services to customers via redemption of purchased stored-value cards.

It will be understood that the specific embodiment of the invention shown and described herein is exemplary only. Numerous variations, changes, substitutions and equivalents will now occur to those skilled in the art without departing from the spirit and scope of the present invention. Accordingly, it is intended that all subject matter described herein and shown in the accompanying drawings be regarded as illustrative only and not in a limiting sense and that the scope of the invention be solely determined by the appended claims.

What is claimed is:

1. A method for managing a stored value transaction comprising:
   distributing indicia of an identifier to a merchant for distribution to a customer having a stored value account, the identifier having an associated stored value, the associated stored value being redeemable with at least one of a plurality of providers, and the customer account being associated between a customer and a specific one of the plurality of providers;
   activating the identifier upon distribution of the indicia to the customer;
   receiving a request from the customer to add the associated stored value to the customer account; and providing to the customer a provider identifier, wherein the provider identifier is effective to add the associated stored value to the customer account.

2. The method of claim 1, wherein the stored value is redeemable for prepaid emergency road service.

3. The method of claim 1, wherein the stored value is redeemable for prepaid film processing.

4. The method of claim 1, wherein the stored value is redeemable for prepaid digital film processing.

5. The method of claim 1, wherein the stored value is redeemable for prepaid dating service.

6. The method of claim 1, wherein the stored value is redeemable for at least one of prepaid electrical, gas, and water service.

7. The method of claim 1, wherein the stored value is redeemable for prepaid movie service.

8. The method of claim 1, wherein the stored value is redeemable for at least one of prepaid bridge and road toll service.

9. The method of claim 1, wherein the stored value is redeemable for prepaid food service.

10. The method of claim 1, wherein the stored value is redeemable for at least one of prepaid legal, accounting, and tax service.

11. A method for managing a stored value transaction comprising:
   establishing a set of identifiers at a central system, each identifier having an associated stored value being redeemable with at least one of a plurality of providers;
   providing indicia of at least some of the identifiers to a plurality of merchants;
   receiving a communication of a first identifier associated with a first indicia from a specific one of the plurality of merchants;
   activating the first identifier associated with the first indicia;
   receiving a request from a customer to add the associated stored value to a customer account associated between a customer and the specific one of the plurality of providers, the request including the first identifier associated with the first indicia, the customer having received the first indicia from the specific one of the plurality of merchants; and
   providing to the customer a provider identifier associated with the specific one of the plurality of providers, wherein the provider identifier is effective to add the associated stored value to the customer account.

12. The method of claim 11, wherein the stored value is redeemable for prepaid emergency road service.

13. The method of claim 11, wherein the stored value is redeemable for film processing.

14. The method of claim 11, wherein the stored value is redeemable for digital film processing.

15. The method of claim 11, wherein the stored value is redeemable for dating service.

16. The method of claim 11, wherein the stored value is redeemable for at least one of electrical, gas, and water service.

17. The method of claim 11, wherein the stored value is redeemable for movie service.

18. The method of claim 11, wherein the stored value is redeemable for at least one of bridge and road toll service.

19. The method of claim 11, wherein the stored value is redeemable for food service.

20. The method of claim 11, wherein the stored value is redeemable for at least one of legal, accounting, and tax service.

21. A computerized method for managing stored-value card data over a communications network between a plurality of terminals and a central processor coupled to a database, each of said terminals being accessible to respective users and located in a respective location generally remote relative to the central processor, the stored-value card data configured to securely process stored-value cards transacted by respective users to enable charging at least one of prepaid services and products to a recipient of the transacted stored-value card, the method comprising:
   storing in the database a plurality of records comprising stored-value card data for each stored-value card;
   processing a "setup" card assigned to that location through each terminal at that location to capture respective identifiers of each terminal;
   associating in each stored record the captured identifiers to uniquely match a respective stored-value card and a respective terminal; and
   transmitting a request of stored-value card activation to the central processor from a respective requesting terminal, the central processor configured to accept said activation request based on whether the associated identifiers for the stored-value card to be activated match identifiers actually transmitted by the requesting terminal for that stored-value card and terminal.

22. The method of claim 21, wherein the stored value card is redeemable for prepaid emergency road service.

23. The method of claim 21, wherein the stored value card is redeemable for prepaid film processing.

24. The method of claim 21, wherein the stored value card is redeemable for prepaid digital film processing.

25. The method of claim 21, wherein the stored value card is redeemable for prepaid dating service.

26. The method of claim 21, wherein the stored value card is redeemable for at least one of prepaid electrical, prepaid gas, and prepaid water service.

27. The method of claim 21, wherein the stored value card is redeemable for prepaid movie service.

28. The method of claim 21, wherein the stored value card is redeemable for at least one of prepaid bridge and prepaid road toll service.

29. The method of claim 21, wherein the stored value card is redeemable for prepaid food service.

30. The method of claim 21, wherein the stored value card is redeemable for at least one of prepaid legal, prepaid accounting, and prepaid tax service.

31. A computerized method for managing stored-value card data over a communications network between a plurality of terminals and a central processor, coupled to a database, each of said terminals being accessible to respective users and located in a respective location generally remote relative to the central processor, the stored-value card data configured to securely process stored value cards transacted by respective users to enable charging at least one of prepaid services and products to a recipient of the transacted stored-value card, the method comprising:
   storing in the database a plurality of records comprising stored-value card data for each stored-value card;
   processing respective identifiers of each terminal;
   associating in each stored record the captured terminal identifiers to uniquely match a respective stored-value card and a respective terminal; and
   transmitting a request for stored-value card activation to the central processor from a respective requesting terminal, the central processor configured to accept said activation request based on whether the associated identifiers for the stored-value card to be activated match identifiers actually transmitted by the requesting terminal for that stored-value card and terminal, wherein each stored-value card has a predefined value and is pre-associated with a single provider.

32. The method of claim 31, wherein the stored value card is redeemable for prepaid emergency road service.

33. The method of claim 31, wherein the stored value card is redeemable for prepaid film processing.

34. The method of claim 31, wherein the stored value card is redeemable for prepaid digital film processing.

35. The method of claim 31, wherein the stored value card is redeemable for prepaid dating service.

36. The method of claim 31, wherein the stored value card is redeemable for at least one of prepaid electrical, prepaid gas, and prepaid water service.

37. The method of claim 31, wherein the stored value card is redeemable for prepaid movie service.

38. The method of claim 31, wherein the stored value card is redeemable for at least one of prepaid bridge and prepaid road toll service.

39. The method of claim 31, wherein the stored value card is redeemable for prepaid food service.

40. The method of claim 31, wherein the stored value card is redeemable for at least one of prepaid legal, prepaid accounting, and prepaid tax service.

41. A computerized method for securely authorizing and distributing stored-value card data over a communications network, the method comprising:
   storing in a database a plurality of records comprising:
      stored-value card data for each stored-value card; and
      at least one of information identifying trusted sources uniquely matched to a stored-value card for making stored-value card processing requests and information identifying trusted communications networks for carrying or transmitting stored-value card processing requests,
   receiving a request for changing the status of the stored-value card over a communications network from a requesting terminal;
   determining at least one of:
      whether the respective requesting terminal is a trusted source of requests; and
      whether the communications network is a trusted communications network for carrying or transmitting requests; and
   processing the request based on the determining step.

42. The method of claim 41, wherein the stored value card is redeemable for prepaid emergency road service.

43. The method of claim 41, wherein the stored value card is redeemable for prepaid film processing.

44. The method of claim 41, wherein the stored value card is redeemable for prepaid digital film processing.

45. The method of claim 41, wherein the stored value card is redeemable for prepaid dating service.

46. The method of claim 41, wherein the stored value card is redeemable for at least one of prepaid electrical, prepaid gas, and prepaid water service.

47. The method of claim 41, wherein the stored value card is redeemable for prepaid movie service.

48. The method of claim 41, wherein the stored value card is redeemable for at least one of prepaid bridge and prepaid road toll service.

49. The method of claim 41, wherein the stored value card is redeemable for prepaid food service.

50. The method of claim 41, wherein the stored value card is redeemable for at least one of prepaid legal, prepaid accounting, and prepaid tax service.

51. A method for reconciling billing information, comprising:
   receiving at a central processor a request to process a current transaction coupled with a prior transaction identifier corresponding to a prior transaction, wherein the current transaction comprises processing a stored value card;
   in response to receiving the prior transaction identifier, determining whether the prior transaction is identical to a first transaction based on the prior transaction identifier and amending a first transaction record to indicate that the first transaction is a questionable transaction if the prior transaction is determined to be different from the first transaction.

52. The method of claim 51, wherein the stored value card is redeemable for emergency road service.

53. The method of claim 51, wherein the stored value card is redeemable for film processing.

54. The method of claim 51, wherein the stored value card is redeemable for digital film processing.

55. The method of claim 51, wherein the stored value card is redeemable for dating service.

56. The method of claim 51, wherein the stored value card is redeemable for at least one of electrical, gas, and water service.

57. The method of claim 51, wherein the stored value card is redeemable for movie service.

58. The method of claim 51, wherein the stored value card is redeemable for at least one of bridge and road toll service.

59. The method of claim 51, wherein the stored value card is redeemable for food service.

60. The method of claim 51, wherein the stored value card is redeemable for at least one of legal, accounting, and tax service.

* * * * *